United States Patent [19]

Bridgelall et al.

[11] Patent Number: 5,569,901
[45] Date of Patent: Oct. 29, 1996

[54] SYMBOL SCANNING SYSTEM AND METHOD HAVING ADAPTIVE PATTERN GENERATION

[75] Inventors: Raj Bridgelall, East Setauket; David Goren, Ronkonkoma; Joseph Katz; Simon Bard, both of Stony Brook, all of N.Y.

[73] Assignee: Symbol Technologies, Inc., Bohemia, N.Y.

[21] Appl. No.: 461,447

[22] Filed: Jun. 5, 1995

Related U.S. Application Data

[62] Division of Ser. No. 271,729, Jul. 7, 1994, abandoned, which is a continuation of Ser. No. 981,448, Nov. 25, 1992, Pat. No. 5,478,997, which is a continuation-in-part of Ser. No. 897,835, Jun. 12, 1992, abandoned, which is a continuation-in-part of Ser. No. 506,674, Apr. 9, 1990, abandoned, which is a continuation of Ser. No. 260,692, Oct. 21, 1988, Pat. No. 4,933,538.

[51] Int. Cl.⁶ .................................................. G06K 7/10
[52] U.S. Cl. ................................................... 235/470
[58] Field of Search .................................. 235/462, 472, 235/470

[56] References Cited

U.S. PATENT DOCUMENTS

| | | | |
|---|---|---|---|
| 3,847,346 | 11/1974 | Dolch | 235/462 |
| 3,892,950 | 7/1975 | Dodson, III | 235/462 |
| 3,909,594 | 9/1975 | Allais et al. | 235/462 |
| 4,360,798 | 11/1982 | Swartz et al. | 235/462 |
| 4,387,297 | 6/1983 | Swartz et al. | 235/462 |
| 4,418,276 | 11/1983 | Yatsunami | 235/462 |
| 4,760,248 | 7/1988 | Swartz et al. | 235/472 |
| 4,792,666 | 12/1988 | Cherry et al. | 235/462 |
| 4,800,256 | 1/1989 | Broockman et al. | 235/462 |
| 4,933,538 | 6/1990 | Heiman et al. | 235/462 |
| 5,115,121 | 5/1992 | Bianco et al. | 235/462 |
| 5,132,523 | 7/1992 | Bassett | 235/462 |
| 5,151,581 | 9/1992 | Krichever et al. | 235/462 |
| 5,157,687 | 10/1992 | Tymes | 235/462 |
| 5,235,167 | 8/1993 | Dvorkis et al. | 235/462 |
| 5,302,813 | 4/1994 | Goren | 235/462 |

*Primary Examiner*—John Shepperd
*Attorney, Agent, or Firm*—Finnegan, Henderson, Farabow, Garrett & Dunner, L.L.P.

[57] ABSTRACT

A system for scanning a symbol that has a plurality of modes including a learning mode and an adaptive mode. When the scanner is in a learning mode, a plurality of scans are generated using a plurality of sets of operating parameters. A decoder decodes the plurality of scans generated by the scanner. A data collector collects readability data indicating whether the generated scan decodes successfully or unsuccessfully for each of the sets of operating parameters. A processor determines whether the readability data is acceptable for each of the sets of operating parameters. An optimal set of operating parameters is selected from the acceptable sets of operating parameters. The optimal set of operating parameters is stored along with data identifying the symbol so that the optimal set of operating parameters may be recalled for use in scanning symbols of a similar type or in a similar environment.

48 Claims, 23 Drawing Sheets

SCANNING RASTER (t = t2)

(t = t2)

(t = t1)

(t = t2)

SYMBOL SCANNING SYSTEM AND METHOD HAVING ADAPTIVE PATTERN GENERATION

This is a divisional of application Ser. No. 08/271,729, filed Jul. 7, 1994, now abandoned. herein incorporated by reference, which is a continuation application of application Ser. No. 07/981,448, filed Nov. 25, 1992, now U.S. Pat. No. 5,478,947 which is a continuation-in-part application of U.S. patent application Ser. No. 07/897,835, now abandoned filed Jun. 12, 1992, which is a continuation-in-part of U.S. patent application Ser. No. 07/506,674, filed Apr. 9, 1990, now abandoned which in turn is a continuation of Ser. No. 07/260,692, filed Oct. 21, 1988, now U.S. Pat. No. 4,933,538. This application is also related to U.S. patent application Ser. No. 07/562,130, filed Aug. 3, 1990, and U.S. patent application Ser. No. 07/553,559, filed Jul. 16, 1990. This application is further related to U.S. patent application Ser. Nos. 07/790,627, filed Nov. 12, 1991, which is a divisional of said Ser. No. 07/562,130; 635,431 filed Dec. 28, 1990; and 07/715,267, filed Jun. 14, 1991, all of said applications being assigned to Symbol Technologies, Inc.

BACKGROUND OF THE INVENTION

1. Field of the Invention

The present invention relates to scanning systems which "read" indicia, for example, barcode symbols, having parts with different light reflectivities and, in particular, to control circuitry which enables such scanning systems to adaptively alter a light beam pattern in response to feedback signals.

2. Description of the Related Art

Various optical readers and optical scanning systems have previously been developed for reading barcode symbols appearing on a label, or on the surface of an article. The barcode symbol itself is a coded pattern of indicia. Generally, scanning systems electro-optically transform the graphic indicia of the symbols into electrical signals which are decoded into alphanumeric characters. The resulting characters describe the article and/or some characteristic of the article to which the symbol is attached. Such characters typically comprise input data to a data processing system for applications in point-of-sale processing, inventory control, and the like.

As used in this specification and in the following claims, the terms "symbol," "barcode," and "barcode symbol" are used to denote a pattern of variable-width bars separated by variable-width spaces. The foregoing terms are intended to be broadly construed to cover many specific forms of one-and two-dimensional patterns including alpha-numeric characters, as well as, bars and spaces.

The specific arrangement of bars or elements in a symbol defines the character represented according to a set of rules and definitions specified by the code. This is called the "symbology" of the code. The relative size of the bars and spaces is determined by the type of code used, as is the actual size of the bars and spaces. The number of characters per inch represented by the barcode symbol is referred to as the density of the symbol.

To encode a desired sequence of characters, a collection of element arrangements are concatenated together to form the complete symbol, with each character being represented by its own corresponding group of elements. In some symbologies, a unique "start" and "stop" character is used to indicate where the barcode symbol begins and ends. A number of different barcode symbologies presently exist. These symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of characters vertically instead of extending symbols bars horizontally. That is, there are several rows of bar and space patterns, instead of one long row. The structure of Code 49 is described in U.S. Pat. No. 4,794,239. Another two-dimensional code structure known as PDF417 is described in U.S. patent application Ser. No. 07/461,881 filed Jan. 5, 1990, commonly assigned to the assignee of the present invention, and hereby incorporated by reference.

Scanning systems have been disclosed, for example, in U.S. Pat. Nos. 4,251,798; 4,369,361; 4,387,297; 4,409,470; 4,760,248; 4,896,026, all of which have been assigned to the assignee of the present invention. As disclosed in some of the above patents, and particularly in U.S. Pat. No. 4,409,470, one existing scanning system comprises a hand-held, portable laser scanning head. The hand-held scanning system is configured to allow a user to manually aim a light beam emanating from the head at a target symbol.

These scanning systems generally include a light source consisting of a gas laser or semiconductor laser. The use of semiconductor devices as the light source in scanning systems is especially desirable because of their small size, low cost and low power requirements. The laser beam is optically manipulated, typically by a focusing optical assembly, to form a beam spot having a certain size at a predetermined target location. Preferably, the cross section of the beam spot at the target location approximates the minimum width between symbol regions of different light reflectivity, i.e., the bars and spaces.

In conventional scanning systems, the light beam is directed by lens or similar optical components along a light path toward a target symbol. The scanner operates by repetitively scanning the light beam in a line or a series of lines across the target symbol by movement of a scanning component such as a mirror disposed in the path of the light beam. The scanning component may sweep the beam spot across the symbol, trace a scan line across and beyond the boundaries of the symbol, and/or scan a predetermined field of view.

Scanning systems also include a sensor or photodetector which functions to detect light reflected or scattered from the symbol. The photodetector or sensor is positioned in the scanner in an optical path so that it has a field of view which extends at least across and slightly beyond the boundaries of the symbol. A portion of the light beam reflected from the symbol is detected and converted into an analog electrical signal.

The analog electrical signal produced by the photodetector is converted by a digitizer circuit in the scanner into a pulse-width modulated digital signal having widths corresponding to the physical widths of the symbol elements. Conventional digitizers include a positive edge detector which sets a "one-shot" circuit having a predetermined time constant, and a negative edge detector which resets the "one-shot" circuit. Some conventional digitizers include circuits for selecting a variable edge detection threshold in an attempt to suppress noise triggered edge detections. Other conventional digitizers incorporate multiple single digitizer circuits in a parallel arrangement to further suppress "false"

edge detections caused by noise in the electrical signal. However, each of these conventional digitizer circuits suffers from an unacceptably high rate of edge "raising" for noisy electrical signals.

The pulse-width modulated digitized signal from the digitizer is decoded, based upon the specific symbology used for the symbol, into a binary data representation of the data encoded in the symbol. The binary data may then be subsequently decoded into the alphanumeric characters represented by the symbol.

The decoding process in conventional scanning systems usually works in the following way. The decoder receives the pulse-width modulated digital signal from the scanner, and an algorithm implemented in software attempts to decode the scan. If the start and stop characters and the characters between them are successfully and completely decoded, the decoding process terminates and an indicator (such as a green light and/or an audible beep) is initiated to inform the user. Otherwise, the decoder receives a next scan, attempts another decode on the scan, and so on, until a completely decoded scan is achieved or no more scans are available.

Overall performance of a scanning system in reading symbols is a function of the optical capabilities of the scanning mechanism in directing a light beam at a target symbol and resolving the reflected light, and a function of the electronic subsystems which convert and process the information contained in the reflected light. A measure of the overall performance of a barcode symbol scanning system is its ability to resolve the narrowest elements of a barcode symbol and its ability to decode symbols located perhaps hundreds of inches away from the scanning system.

One limiting factor in the ability of conventional scanning systems to correctly resolve elements in a barcode symbol is the degree to which conventional digitizers produce false edge detections. As previously mentioned, false edge detections result from noise on the electrical signal representing the received portion of the light beam reflected from the symbol. False edge detections corrupt the pulse-width modulated signal corresponding to the symbol elements, and must be compensated for by rescanning the symbol to obtain a less noisy electrical signal or by employing some form of error detection and correction. Either compensation scheme slows signal processing in the scanning system.

Continuing attempts have been made to design and implement an improved scanning system which has very high overall performance in a wide variety of operational environments. Conventional scanning systems adjust scanning parameters, if at all, on a piecemeal basis. Such adjustments are typically made manually, and often require the intervention of a trained technician. Furthermore, conventional adjustments are made only to a single, independent scanning system parameter such as beam intensity or amplifier gain.

Conventional scanning systems also typically use a preset light beam pattern which takes the form of a repeated linear scan, a standard raster scan, or jittered raster scan. These systems suffer from the disadvantage that laser scanning systems must substantially align light beam pattern scan lines with the rows of a symbol. Although a two-dimensional barcode symbol such as PDF417 allows some deviation in this alignment, the orientation of the scan lines must still be less than a maximum angle relative to the rows of the symbol.

Very fast conventional scanning systems also require the operator to manually align the scan lines with symbol rows, typically by moving the scanning device or the article being scanned in order to improve the chances of reading the symbol. This requirement is particularly impractical where the scanned articles are large or heavy, or in applications where scanning is intended to be automated.

The light beam pattern of a conventional scanning system is usually preset according to an intended mode of scanning. For example, a hand-held scanning system will use an "optimal" handheld light beam pattern. In contrast, a fixed or presentation type scanning system will be preset to a different "optimal" light beam pattern for fixed scanning applications. Since these preset, "mode optimal" light beam patterns can not be easily changed, conventional scanning systems can not be quickly and efficiently switched between scanning modes.

Conventional scanning systems also cannot be efficiently used in applications which require scanning of two or more different symbols. For example, if an article has one-dimensional and two-dimensional symbols attached to it conventional scanning systems cannot alternatively optimize the light beam pattern to read each symbol efficiently. A series of articles having symbols with different symbologies presents a similar problem to a scanning systems with a preset light beam pattern.

Finally, conventional scanning systems can not be used to "track," or follow a symbol on a moving object.

SUMMARY OF THE INVENTION

Accordingly, it is a goal of the present invention to provide a method and apparatus for adaptively generating a light beam pattern in accordance with one or more feedback signals.

These and other goals may be achieved by using an adaptive scanning system which accepts feedback signals indicative of symbol readability and environmental conditions at a predetermined location proximate the symbol, and which alters a light beam pattern to improve symbol readability in response to the feedback signals. In particular, the foregoing goals may be achieved by an adaptive scanning system that operates in a plurality of modes including a learning mode. When the scanner is in a learning mode, a plurality of scans are generated using a plurality of sets of operating parameters. A decoder decodes the plurality of scans generated by the scanner and a data collector collects readability data indicating whether the generated scan decodes successfully or unsuccessfully for each of the sets of operating parameters. A processor determines whether the readability data is acceptable and a storage device stores the set of operating parameters when the readability data is acceptable. An optimal set of operating parameters is selected from the acceptable sets of operating parameters. The optimal set of operating parameters is stored along with data identifying the symbol so that the optimal set of operating parameters may be recalled for use in scanning symbols of a similar type or in a similar environment.

A method is also disclosed that includes the step of scanning a symbol a plurality of times using a plurality of different operating parameters. Readability data is collected that indicates whether the scanning of a symbol decodes successfully or unsuccessfully for each of the sets of operating parameters. If the readability data is determined to be acceptable, the set of operating parameters is stored. An optimal set of operating parameters is selected from a set of operating parameters that are determined to be acceptable. The optimal set of operating parameters is stored for later retrieval.

It is to be understood that both the foregoing general description and the following detailed description are exemplary and explanatory, and are not restrictive of the invention as claimed. The accompanying drawings, which are incorporated in and constitute a part of the specification, illustrate embodiments of the present invention and together with the general description, serve to explain the principles of the present invention.

BRIEF DESCRIPTION OF THE DRAWINGS

FIG. 17a is a block diagram illustrating an embodiment of the rotator/translator shown in FIG. 1.

FIG. 17b is a block diagram illustrating an embodiment of a "multiplier" used in the rotator/translator shown in FIG. 17a.

FIG. 19b is a side view cut-away of the schematic block diagram illustrating the embodiment of the X/Y scanning head shown in FIG. 19a.

FIG. 20(b) shows a cross-section of the autofocusing lens arrangement shown in FIG. 20(a).

DESCRIPTION OF THE PREFERRED EMBODIMENTS

A. GENERAL DESCRIPTION

Figure 1:
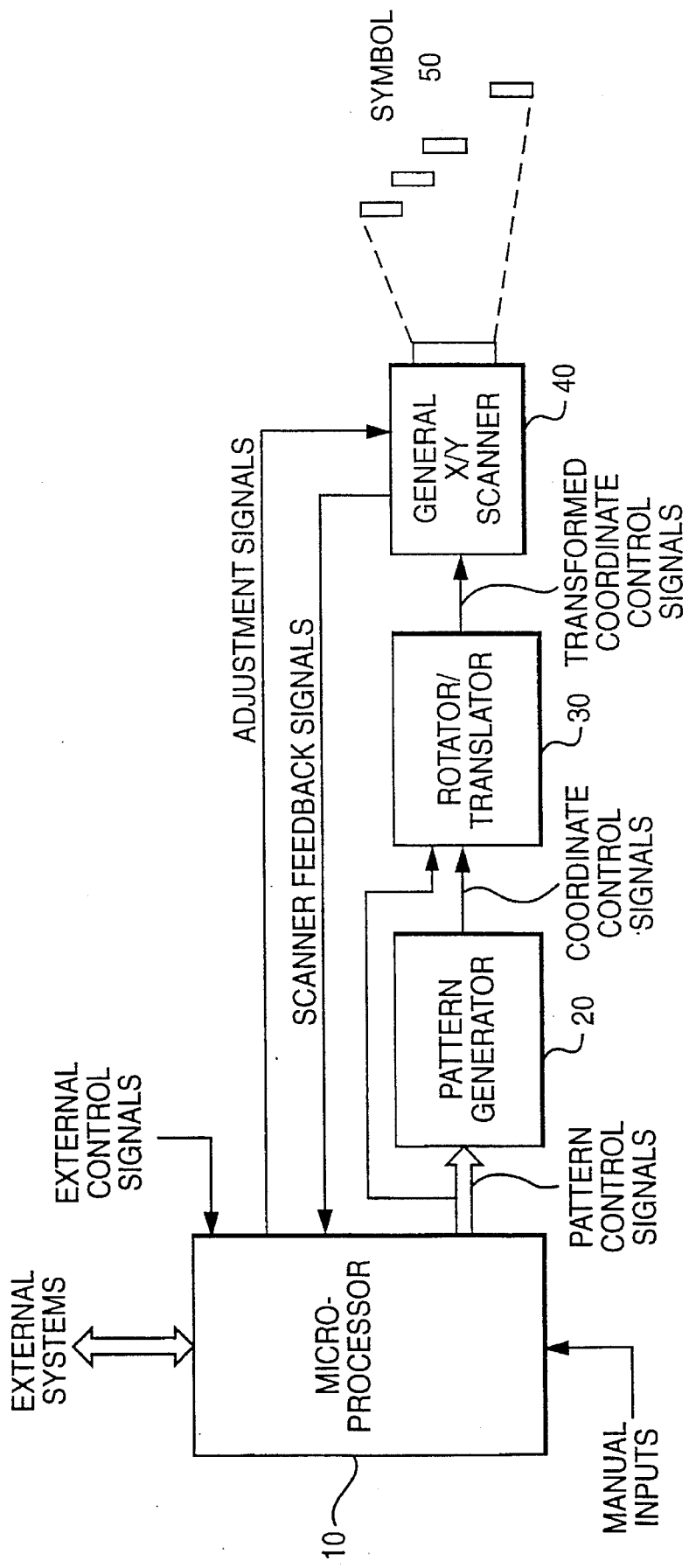
FIG. 1 is a block diagram illustrating an embodiment of a scanning system according to the present invention having an adaptive pattern generator.

An embodiment of the present invention is shown generally in FIG. 1. Symbol 50 is scanned by a light beam generated and directed by general X/Y scanner 40. Symbol 50 may be a one- or two-dimensional barcode symbol as previously described. The embodiment may reside in a hand-held, desktop workstation, or stationary scanning system as described hereafter.

Scanner 40 directs a light beam at a predetermined location, detects light reflected from symbol 50, and generates feedback signals indicative of light beam scanning efficiencies, symbol readability, position of the symbol and/or environmental conditions surrounding symbol 50. Feedback signals may include percent decode rate, lighting conditions, mode of scanning (handheld, fixed or presentation), scanning speed, beam focus (for example, a fuzzy logic approach to focusing may be taken) symbology, and symbol density, range, location and orientation. Feedback signals are applied to microprocessor 10 which controls light beam pattern generation and scanner adjustments on the basis of one or more of the feedback signals.

A program running in, or callable by, microprocessor 10 optimizes the operating parameters of scanner 40 to improve symbol scanning efficiency. Among the operating parameters capable of being optimized by microprocessor 10 are scanning beam spot size and/or working distance from the symbol 50. U.S. Pat. No. 4,808,804, commonly assigned to the assignee of the present invention and incorporated by reference herein, is directed to symbol readers with variable spot size and/or working distance. Additionally, among the operating parameters capable of being optimized by microprocessor 10 are light beam intensity and/or single plane scanning angle. U.S. Pat. No. 4,933,538, commonly assigned to the assignee of the present invention and incorporated by reference herein, is directed to scanning systems with adjustable light intensity and/or single plane scanning angle.

In addition to one or more of these operating parameters, the present invention may alter the pattern in which the light beam is generated by scanner 40 and directed at symbol 50. This control process of adaptively altering the light beam pattern in response to feedback signals supplied by scanner 40 or by an external source will be described in detail below. Generally speaking, microprocessor 10 provides pattern control signals to pattern generator 20. Manual inputs from a user interface (not shown) may also be provided to microprocessor 10, and subsequently, or simultaneously, to pattern generator 20. Similarly, external inputs from external systems, such as an interconnected data base, or control computer system, may be provided to microprocessor 10. Manual inputs or external inputs may supplant, override, or modify the pattern control signals generated by microprocessor 10.

In response to pattern control signals generated by microprocessor 10, pattern generator 20 provides a new or modified set of coordinate control signals to scanner 40. The coordinate signals, when applied to the scanner 40, control the optical assembly or scanner control logic such that the pattern of the directed light beam is altered into a new pattern or modified into a variation of the existing pattern.

As shown in FIG. 1, the coordinate control signals may be transformed by a rotator/translator 30 before being applied to scanner 40. By transforming the coordinate control signals, the new light beam pattern may be translated to a new location and/or be rotated to a new angular disposition with respect to the previous light beam pattern. In an embodiment of the present invention comprising a rotator/translator 30, microprocessor 10 provides, as a pattern control signal, a displacement signal to the rotator/translator 30. The displacement signal indicates the relative angular orientation and/or location of a light beam pattern to a previous light beam pattern. Alternatively, the displacement signal may indicate the angular orientation relative to a reference location or to a static reference point. In response to the displacement signal, the rotator/translator 30 modifies or transforms, the coordinate control signals from the pattern generator 20 in order to direct the light beam pattern more accurately at symbol 50.

Each of the foregoing elements, microprocessor 10, pattern generator 20, rotator/translator 30 and scanner 40, will be described in detail below. Each of the elements is discussed as a separate functional entity for purposes of clarity. However, one of ordinary skill in the art will recognize that two or more elements may be combined in a single circuit structure or software routine. For example, a single circuit or software routine may simultaneously perform the functions mentioned above with respect to pattern generator 20 and rotator/translator 30. Following a description of the foregoing elements, various modes of operation, and exemplary feedback signals operative upon the present invention will be described.

Embodiments of the present invention may generally be similar to the style disclosed in U.S. Pat. Nos. 4,760,248, or in 4,896,026, both assigned to the assignee of the present invention and may also be similar to a symbol scanning system commercially available as part number LS 8500 or LS 2000 from Symbol Technologies, Inc. Alternatively, or in addition, features of U.S. Pat. Nos. 4,387,297, or 4,409,470, both assigned to the assignee of the present invention, may be employed in constructing the scanning system shown in FIG. 2. U.S. Pat. Nos. 4,760,248, 4,896,026 and 4,409,470 are incorporated herein by reference, but the general design of such devices will be briefly described below for completeness.

Figure 2:
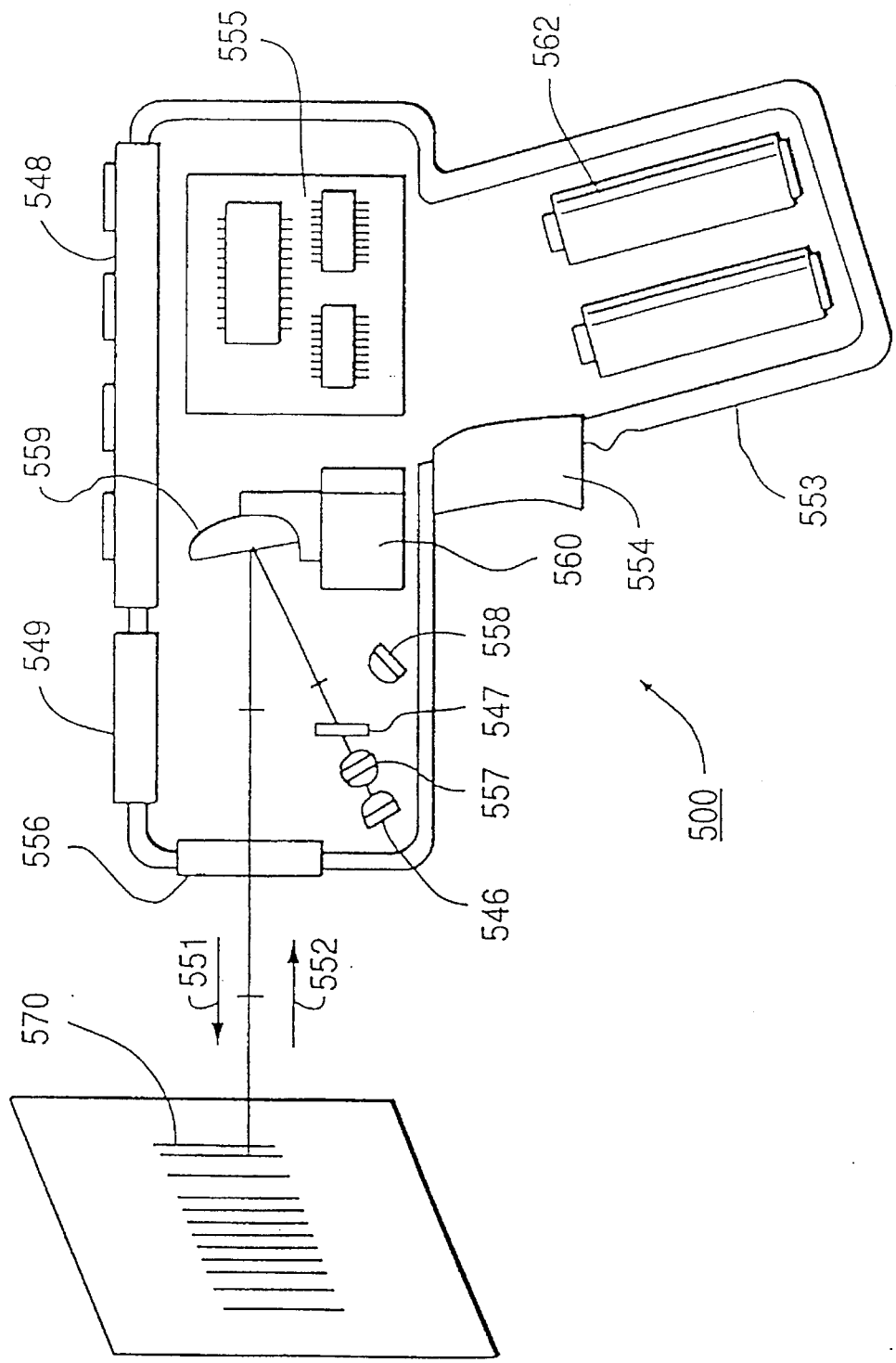
FIG. 2 is a block diagram illustrating a gun-shaped embodiment of scanning system of FIG. 1.

The gun-shaped scanning system in FIG. 2 illustrates the embodiment of the present invention shown in FIG. 1 in greater detail. Scanning system 500 has a pistol-grip type handle 553, and a movable, manually-actuated trigger switch 554 which allow the user to activate light beam 551 after the user has positioned the scanning system to point at symbol 570. A light-weight plastic housing 555 contains laser light source 546, detector 558, optics and signal processing circuitry 555, including a pattern generator, rotator/translator, and microprocessor, and power source or battery 562.

A light-transmissive window 556 in the front end of housing 555 allows outgoing light beam 551 to exit and the incoming reflected light 552 to enter. Scanning system 500 is designed to be aimed at barcode symbol 570 by a user from a position in which the scanning system 500 is spaced from the symbol, or moving across the symbol. Typically, this type of hand-held scanning system is specified to operate at a range of greater than several inches. Scanning system 500 may also function as a portable computer terminal, and in such embodiments includes a keyboard 548 and a display 549, such as described in the previously noted U.S. Pat. No. 4,409,470.

As further depicted in FIG. 2, a beam splitter 547, or multiple lens system of the type discussed hereafter, may be used to focus the light beam into a scanning spot in an appropriate reference plane at the predetermined location. A light source 546, such as a semiconductor laser diode, is positioned to introduce a light beam into the axis of lens 557, and the beam passes through a partially-silvered mirror 547 and other lenses or beam-shaping structure is needed. The beam is reflected from an oscillating mirror 559 which is coupled to a scanning motor 560 which is energized when trigger 554 is pulled. If the light produced by source 546 is marginally visible, an aiming light may be included in the optical system. The aiming light if needed, produces a visible-light spot which may be fixed, or scanned just like the laser beam; the user employs this visible light to aim the scanning system at the symbol before pulling the trigger.

Figure 3:
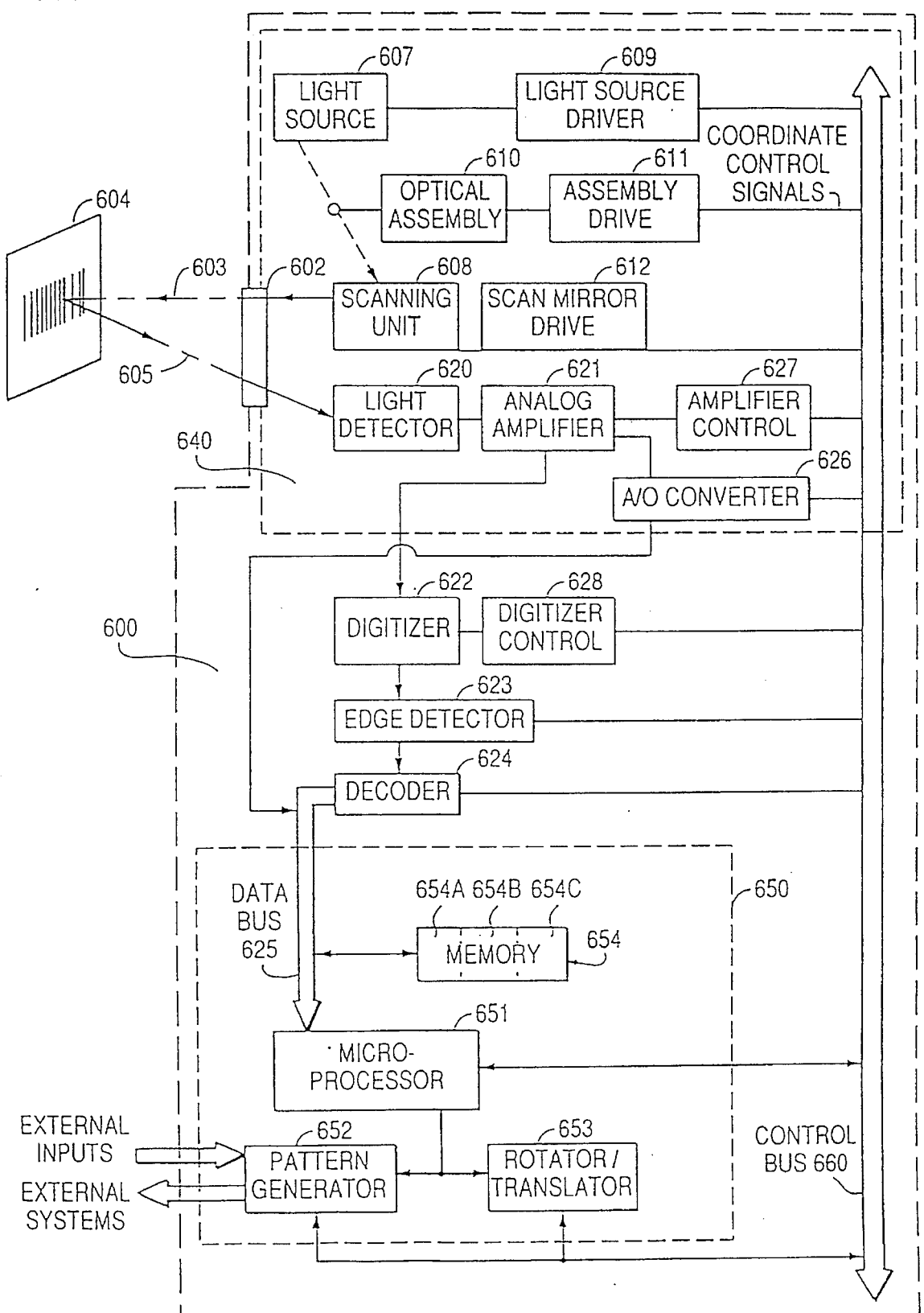
FIG. 3 is a block diagram illustrating another embodiment of the scanning system of FIG. 1.

A simplified block diagram of another embodiment of the present invention is shown in FIG. 3. In FIG. 3, scanner 640, corresponding to element 40 shown in FIG. 1, is illustrated in greater detail, as is the relationship between scanner 640 and control logic unit 650 comprising microprocessor 651, pattern generator 652, and rotator/translator 653. Scanning system 600 may be implemented as a portable (hand-held) scanning system, as a desk-top workstation or as a stationary (fixed) scanning system.

In scanner 640, outgoing light beam 603 is generated by light source 607, usually a laser diode or the like. The light beam from light source 607 is optically modified by an optical assembly 610. The optical assembly 610 may include the auto-focusing lens, and dual Y/X lens elements described hereafter, a scanning motor unit and various control/drive circuitry. Generally speaking, optical assembly 610 is responsive to coordinate control signals transferred from the control logic unit 650 via control bus 660. The outgoing light beam is typically sized and shaped by optical assembly 610 and scanned in a specific pattern. The light beam pattern may be a single line, a raster, or more complex two-dimensional pattern. Scanned beam 603 is then directed by scanning system 600 through an exit window 602 to impinge upon a code bar symbol 604 disposed at a predetermined target location.

Reflected and/or scattered light 605 from symbol 604 is detected by a light detector 620 of scanner element 640. Light detector 620 produces electrical signals to be processed and decoded in order to reproduce the data represented in barcode symbol 604. The output of light detector 620 is applied to an analog amplifier 621 having an adjustable or selectable gain and bandwidth. Amplifier control signals applied from data bus 625 effect adjustment of circuit values in analog amplifier 621. One output of analog amplifier 621 is applied to an analog-to-digital (A/D) converter 626. A/D converter 626 is connected to control bus 660 to transfer the sampled digital signal for processing by control logic unit 650.

Another output of analog amplifier 621 is applied to a digitizer 622. Digitizer 622 converts the analog signal from analog amplifier 621 into a pulse width modulated digital signal. Digitizer 622, described hereafter, utilizes variable threshold levels which, according to the present invention, can be appropriately adjusted. Digitizer control signals from control bus 660 effect the adjustment of threshold levels in digitizer 622.

The output of digitizer 622 is applied to an edge detector 623. The operation of edge detector 623 is explained in U.S. application Ser. No. 506,674 filed Apr. 9, 1990. Edge detector 623 is connected to decoder 624, which may function in the conventional manner described in the BACKGROUND OF THE INVENTION or in the manner described hereafter. The decoded data may be stored in a latch (not shown) which is connected to data bus 625, and control bus 660. Decoded data is thus presented to control logic unit 650 for further processing and also may be subsequently applied to external systems and/or an external memory.

Figure 4:
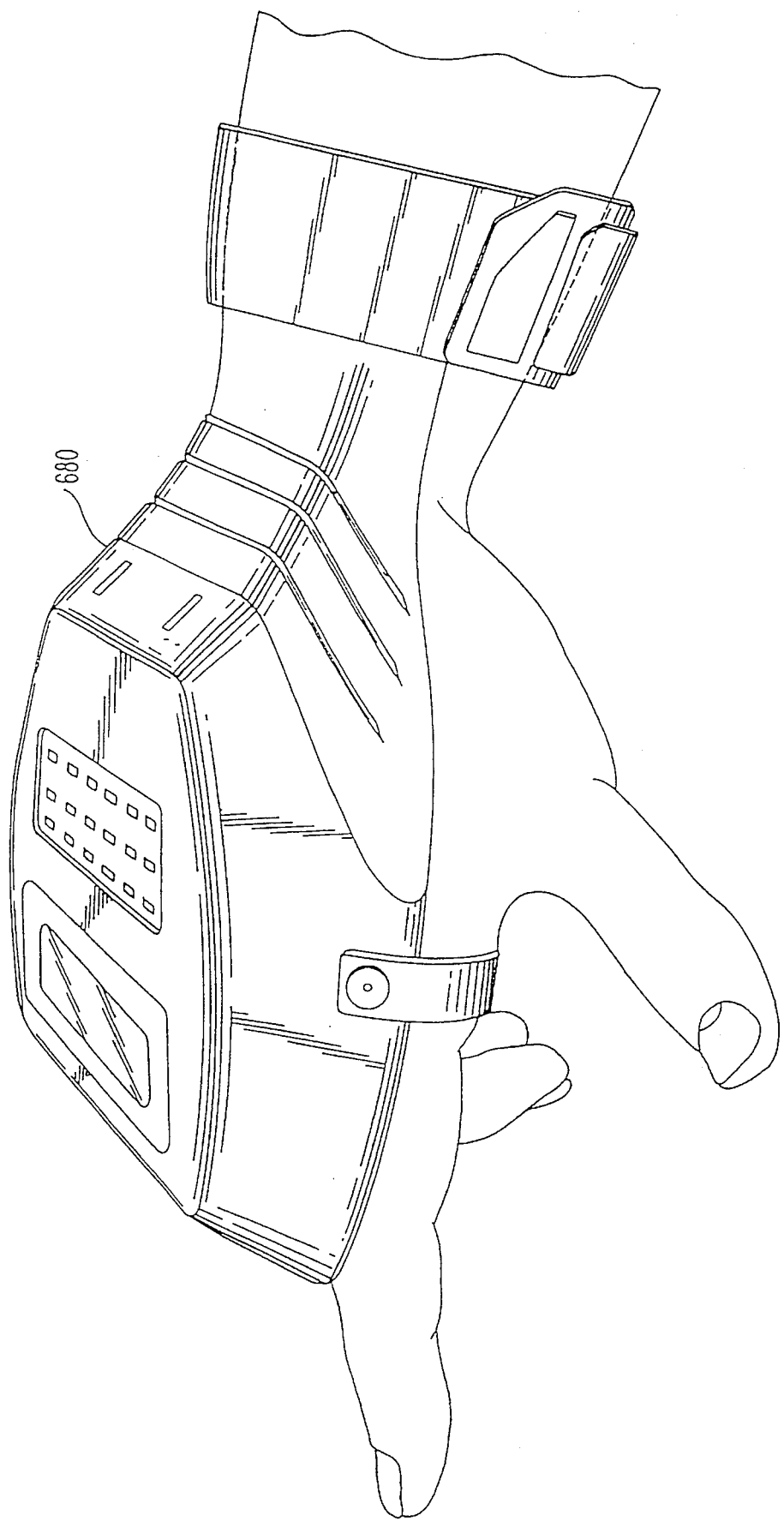
FIG. 4 is a block diagram illustrating a hand-mounted embodiment of the scanning system of FIG. 1.
Figure 5:
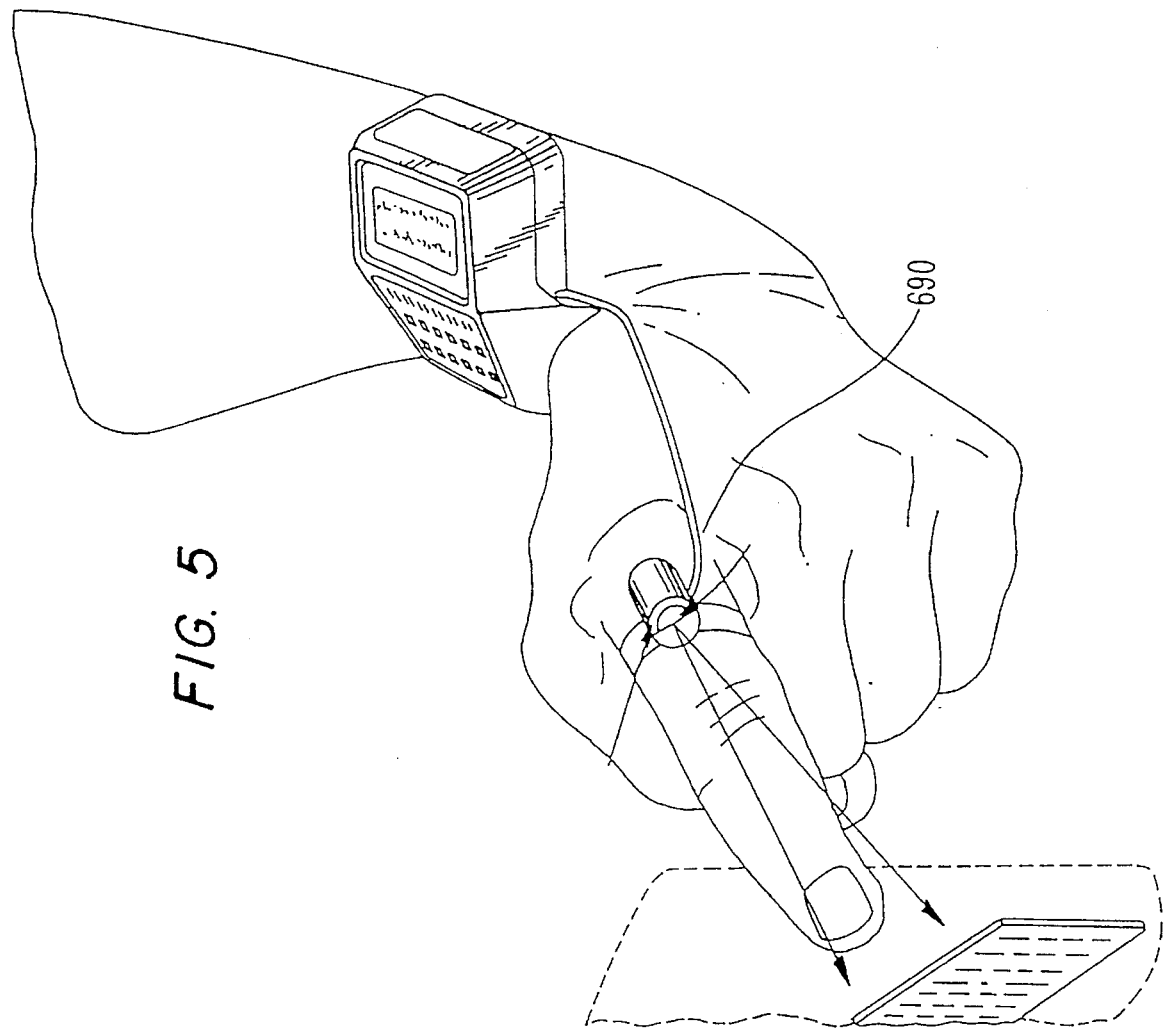
FIG. 5 is a block diagram illustrating a ring-mounted embodiment of the scanning system of FIG. 1.
Figure 8:
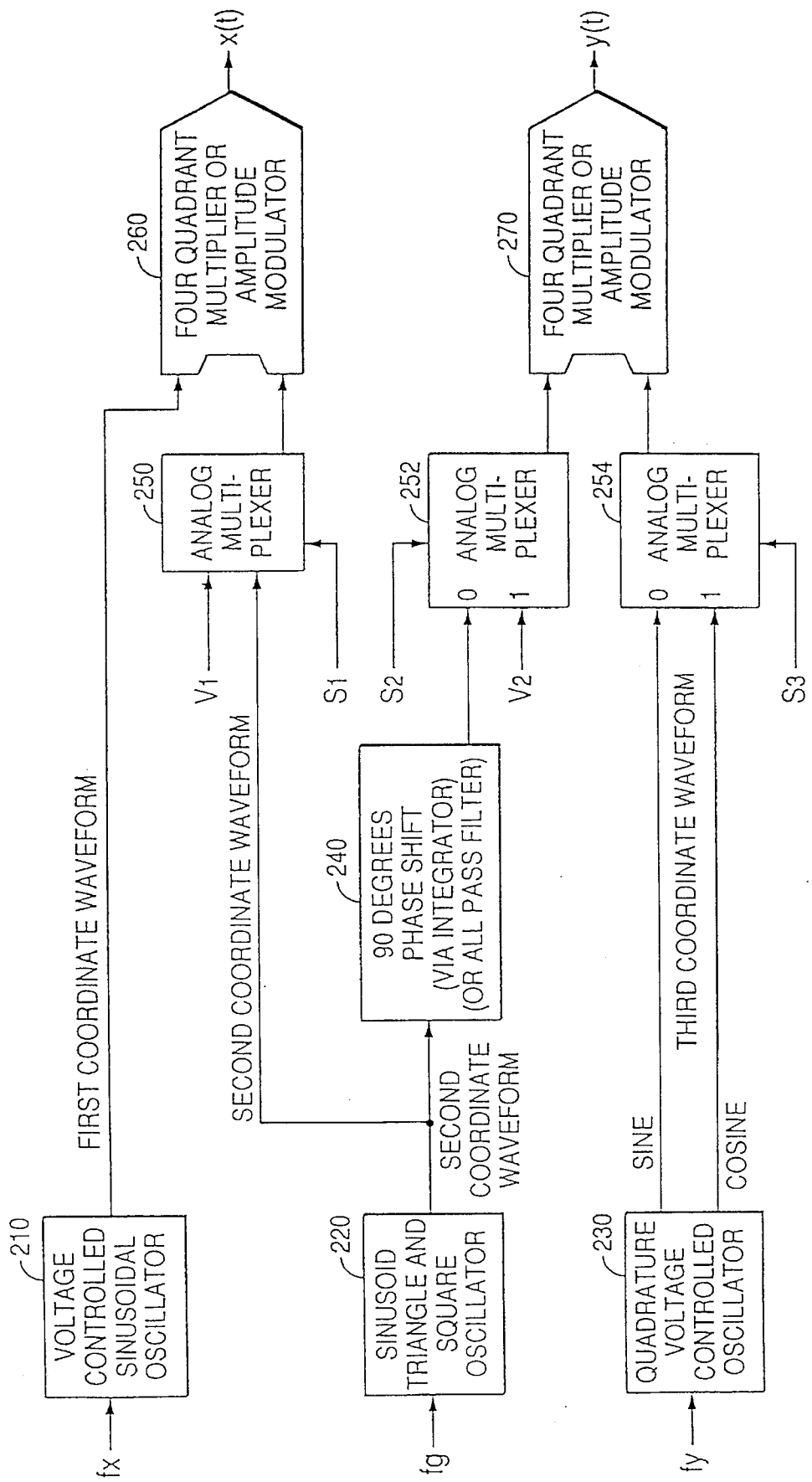
FIG. 8 is a block diagram illustrating an embodiment of the pattern generator shown in the scanning system of FIG. 1.

An embodiment of the present invention may assume the form of a hand-mounted unit 680, such as that shown in FIG. 4, or 8 ring-scanner 690, such as that shown in FIG. 5. A movable trigger switch, such as the one shown on the housing in FIG. 2, may be employed to allow the user to manually activate the scanner when the user has directed the scanning system at a symbol to be read. Various "triggerless" activation techniques such as voice and object sensing may also be used.

B. THE MICROPROCESSOR

Figure 6:
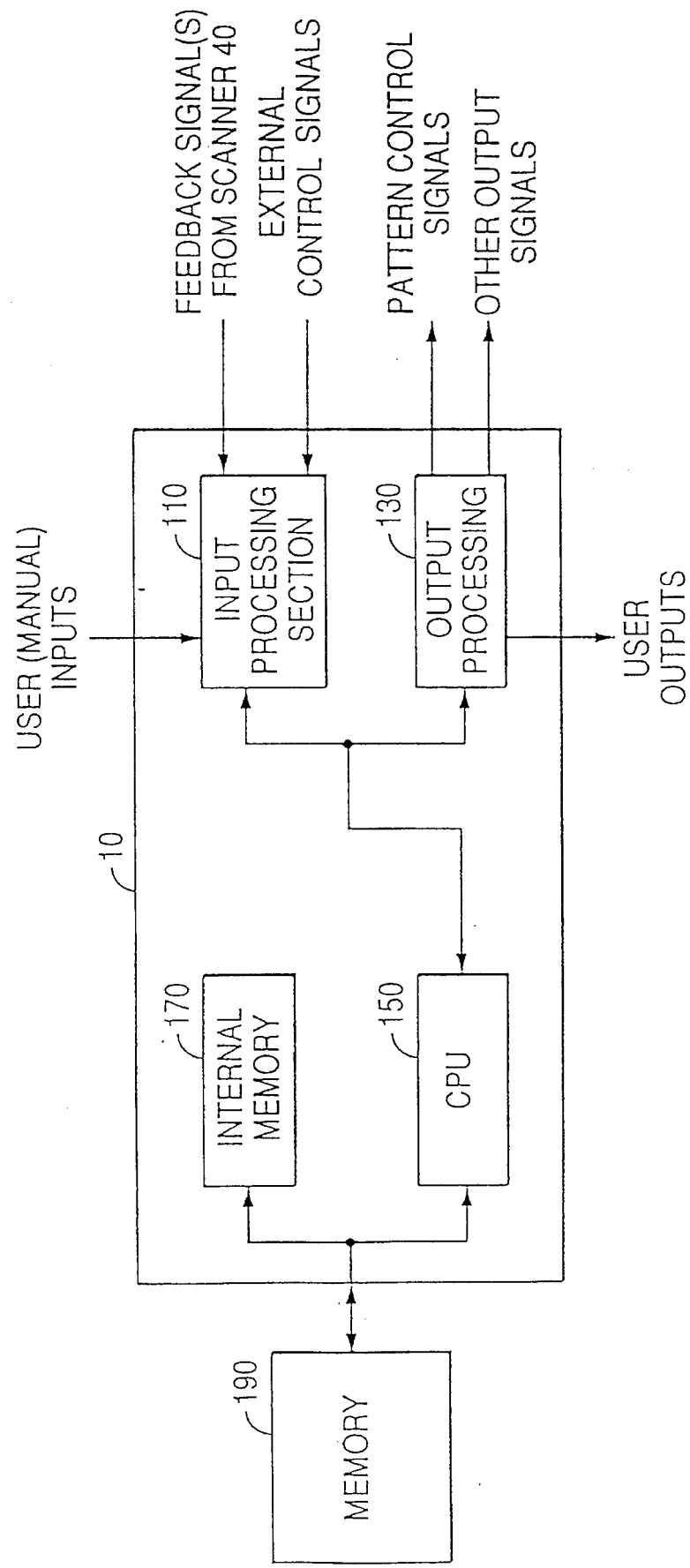
FIG. 6 is in block diagram illustrating the microprocessor shown in the scanning system of FIG. 1.

FIG. 6 generally illustrates an exemplary microprocessor 10 of the type used in an embodiment of the present invention. Input signals received from a user interface (not shown), scanner 40 (FIG. 1) or other external devices are received and processed in an input processing section 110. Input processing section 110 includes buffer circuits and other processing circuits which convert input signal levels and input signal forms into electrical signals compatible with internal microprocessor operations. Output processing section 130 analogously converts internal microprocessor electrical signals into output signals compatible with the user interface, pattern generator 20, rotator translator 30, scanner 40, and other external circuits.

In response to the various input signals, the control logic section 150 of microprocessor 10 calls subroutines from internal memory 170 or external memory 190, and executes the subroutines to adaptively alter the various output signals. Specific microprocessor operations will be described in greater detail in following sections.

C. THE PATTERN GENERATOR

Figure 7:
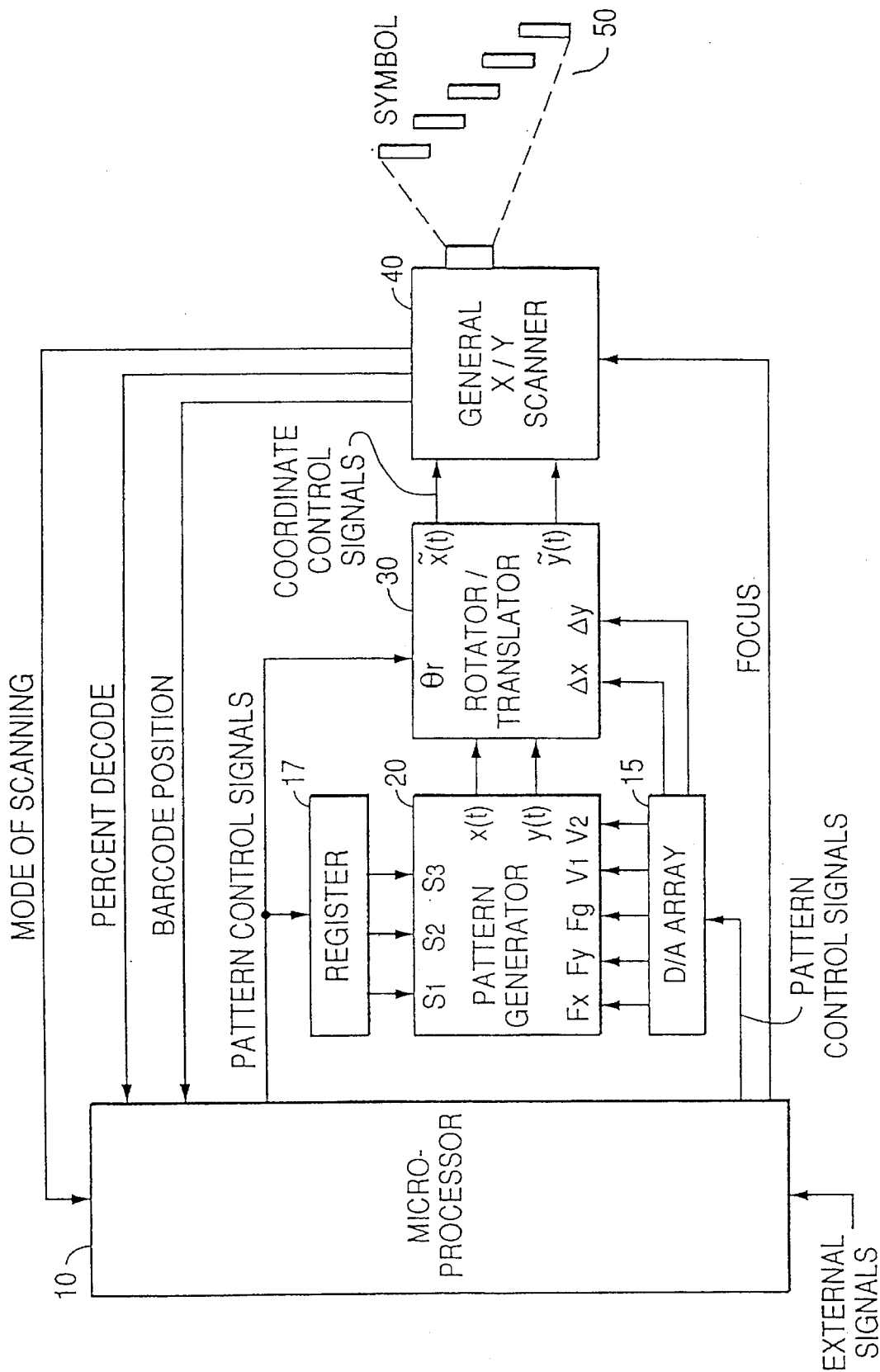
FIG. 7 is a block diagram illustrating the scanning system of FIG. 1 in greater detail.

FIG. 7 illustrates in greater detail the embodiment of the present invention shown in FIG. 1. A pattern generator circuit 20 of the type used in an embodiment of the present invention is shown in detail in FIG. 8.

In FIG. 7, microprocessor 10, in response to various feedback signals, generates pattern control signals including oscillator control signals fx, fg, and fy, switch signals S1, S2 and S3, and DC waveform control voltages V1 and V2. From this set of pattern control signals, pattern generator 20 generates coordinate control signals x(t) and y(t) which are applied to scanner 40 through rotator/translator 30. Several of the pattern control signals generated in microprocessor 10 are typically n-bit, signed digital words which are converted to analog form by output processing section 130 of the microprocessor 10 (see FIG. 6), or by an external D/A convertor array 15 shown, for example, in FIG. 7. Alternatively, conventional monolithic oscillators having digital inputs for frequency selection can be used. Single-bit switch signals may be held in output processing section 130 or in a register 17 internal or external to pattern generator 20.

As shown in FIG. 8, once converted into analog form, oscillator control signals fx, fg, and fy are respectively applied to separate oscillators. First oscillator control signal fx is applied to the input of a conventional voltage controlled sinusoidal oscillator 210 to produce a first coordinate waveform signal which is applied to a first four quadrant multiplier (or amplitude modulator) 260.

Second oscillator control signal fg is applied to the input of sinusoid, triangle and square waveform oscillator 220. Conventional forms of this oscillator, for example NE566 manufactured by Signetics is commercially available. The output of oscillator 220 is applied to a second input of a first analog multiplexer 250. First waveform control voltage V1 is applied to a first input of first analog multiplexer 250. The output of first analog multiplexer 250 is selected in accordance with first switch signal S1, and applied to first four quadrant multiplier 260. The first coordinate control signal x(t) is, thus, a product of the first coordinate waveform and the output of first analog multiplexer 250.

The output of oscillator 220 is also applied to a first input of second analog multiplexer 252 through a 90° phase shifting circuit, such as an integrator circuit or an all pass filter. Second waveform control voltage V2 is applied to a second input of second analog multiplexer 252. The output of second analog multiplexer 252 is selected in accordance with second switch signal S2, and applied to second four quadrant multiplier 270.

Third oscillator control signal fy is applied to the input of a conventional quaduature voltage controlled oscillator 230. The output of oscillator 230 is generated in sine and cosine waveforms which are respectively applied to the first and second inputs of third analog multiplexer 254. The output of third analog multiplexer 254 is selected in accordance with third switch signal S3 and applied to second four quadrant multiplier 270. The second coordinate control signal y(t) is, thus, a product of the output of second analog multiplexer 252 and the output of third multiplexer 254.

The foregoing circuitry implements the following set of pattern generating equations:

$$x(t) = \begin{vmatrix} V1 & \text{if } S1 = 0 \\ \sin(2\pi f g t) & \text{if } S1 = 1 \end{vmatrix} \times |\sin(2\pi f x t)| \quad (1)$$

$$y(t) = \begin{vmatrix} \cos(2\pi f g t) & \text{if } S2 = 0 \\ V2 & \text{if } S2 = 1 \end{vmatrix} \times \begin{vmatrix} \sin(2\pi f y t) & \text{if } S3 = 0 \\ \cos(2\pi f y t) & \text{if } S3 = 1 \end{vmatrix} \quad (2)$$

The coordinate control signals x(t) and y(t) are applied to the scanner 40 in a manner discussed hereafter. When applied to scanner 40, the coordinate control signals control the pattern in which the light beam is directed at a barcode symbol proximate a predetermined location. As feedback signals change, the algorithms run in microprocessor 10 generate new values for pattern control signals fx, fg, fy, S1, S2, S3, V1 and V2. Resulting combinations of these pattern control signals generate new coordinate control signals, x(t)

and y(t) which are better adapted to environmental conditions at the predetermined location and/or to condition affecting symbol readability.

Figure 9A:
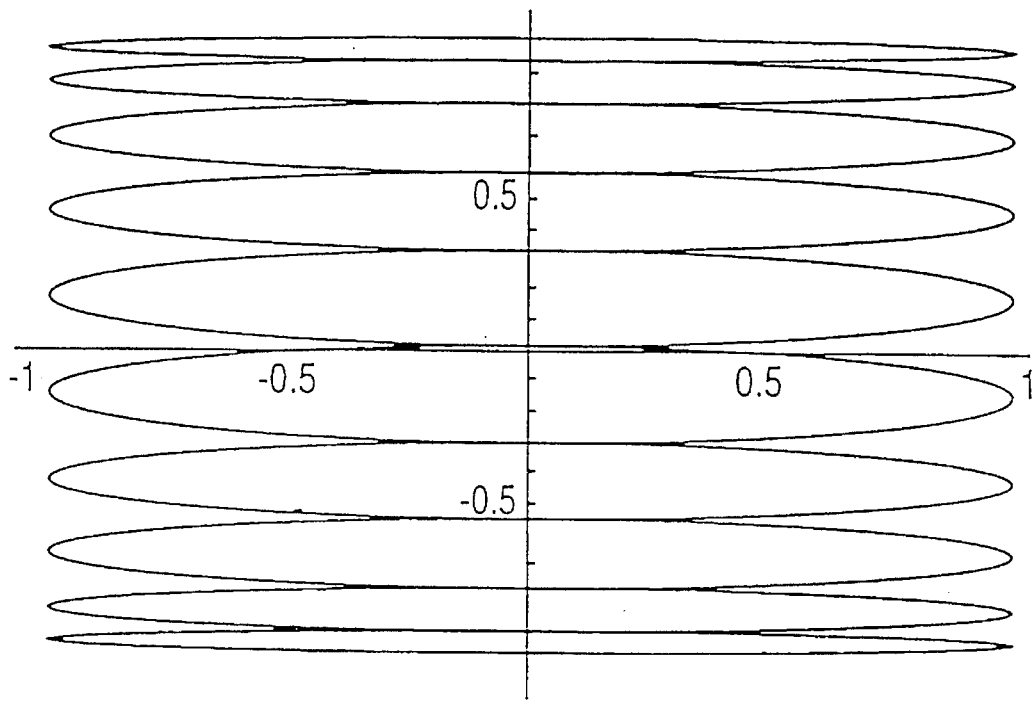
FIG. 9(a) is a diagram illustrating a standard (synchronous) raster light beam pattern.
Figure 9B:
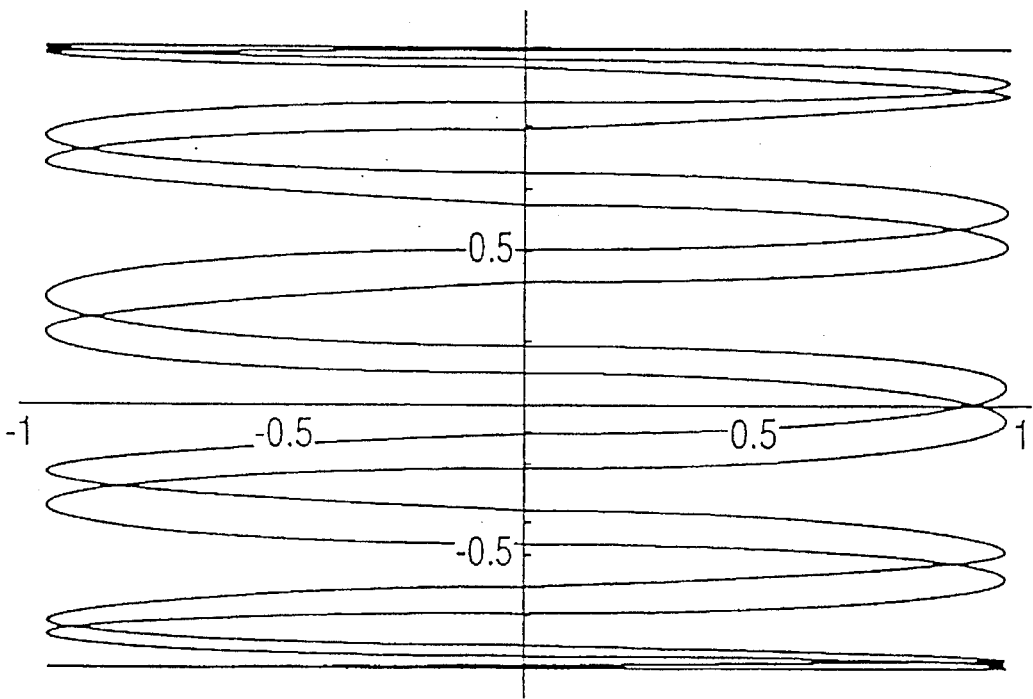
FIG. 9(b) is a diagram illustrating a jittering (asynchronous) raster light beam pattern.

Variations in the coordinate control signals x(t) and y(t) can produce an infinite variety of one- and two-dimensional light beam patterns. In addition to linear light beam patterns, the present invention can direct the light beam in the standard raster and jittering raster patterns shown in FIGS. 9(a) and 9(b). Other light beam patterns are also easily obtained by the present invention. FIGS. 10–16 illustrate exemplary two-dimensional light beam patterns obtainable by the present invention. Each exemplary light beam pattern is shown in relation to an X/Y reference axis of unity scale. As will be seen hereafter, the present invention may rotate each light beam pattern about the origin of the X/Y reference axis and/or scale the actual size of the light beam pattern at the predetermined location.

Figure 10:
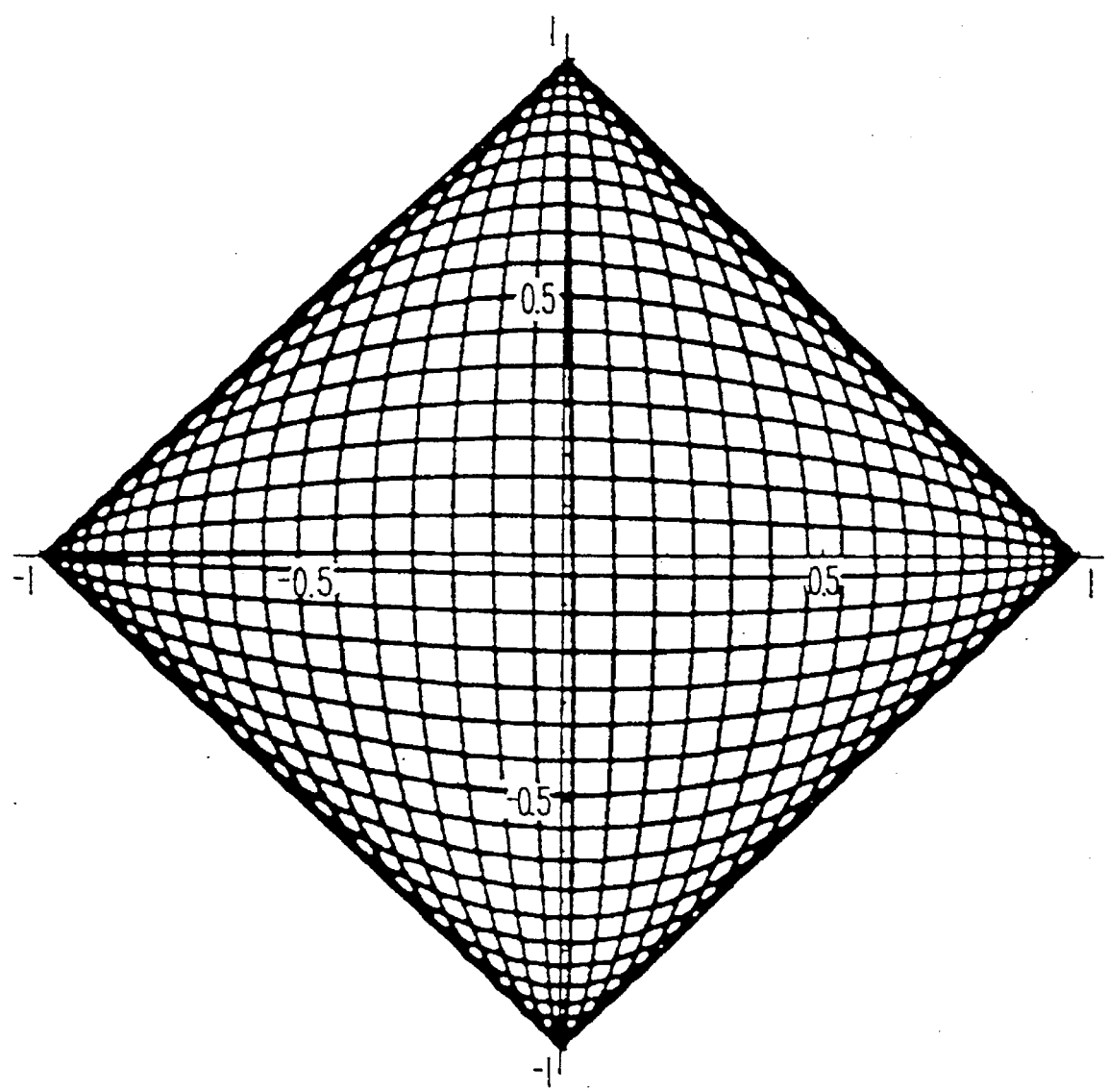
FIGS. 10 is a diagram illustrating a "grid" shaped light beam pattern.
Figure 11:
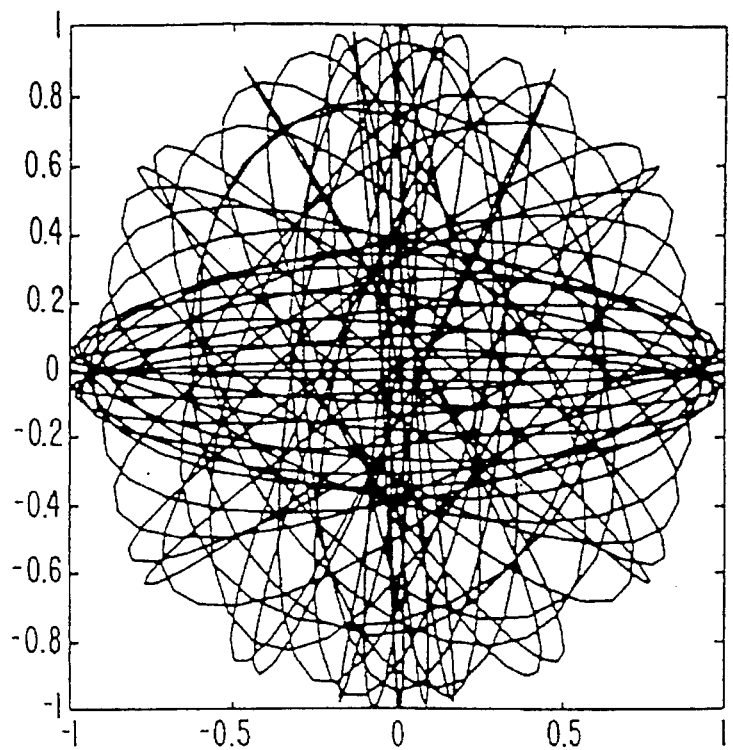
FIGS. 11 is a diagram illustrating a rotating and breathing ellipse light beam pattern.
Figure 12:
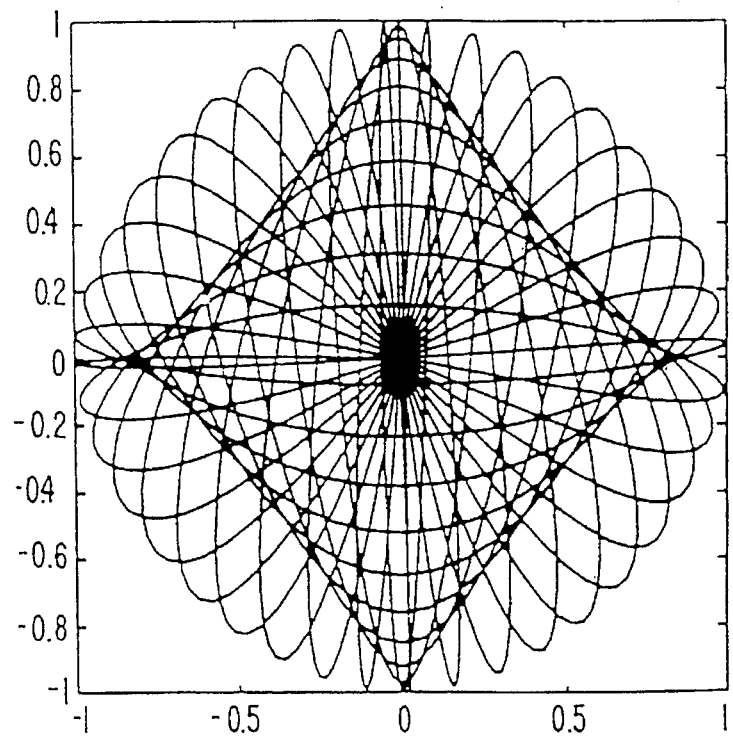
FIGS. 12 is a diagram illustrating a rotating and breathing lissajous light beam pattern.
Figure 13:
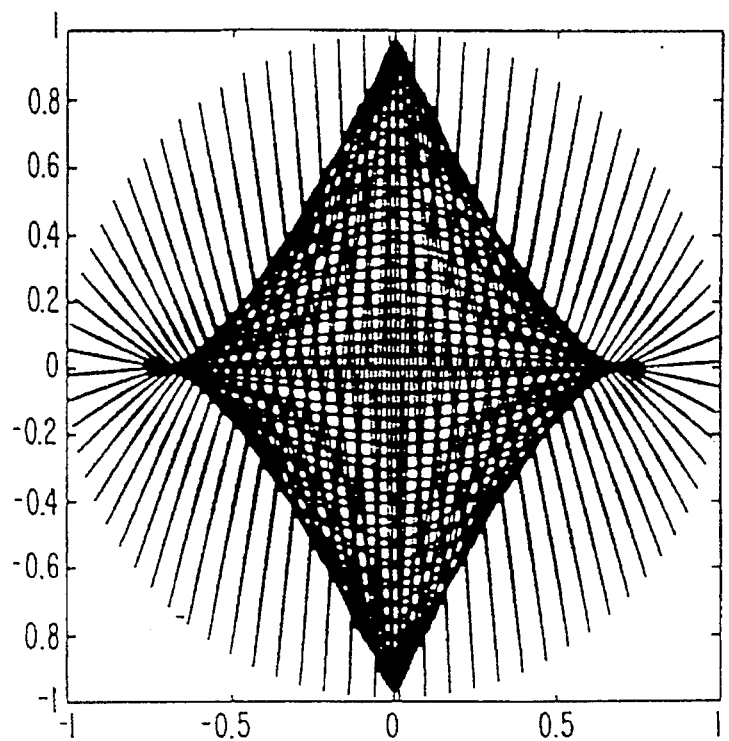
FIGS. 13 is a diagram illustrating a "fishbone" shaped light beam pattern.
Figure 14:
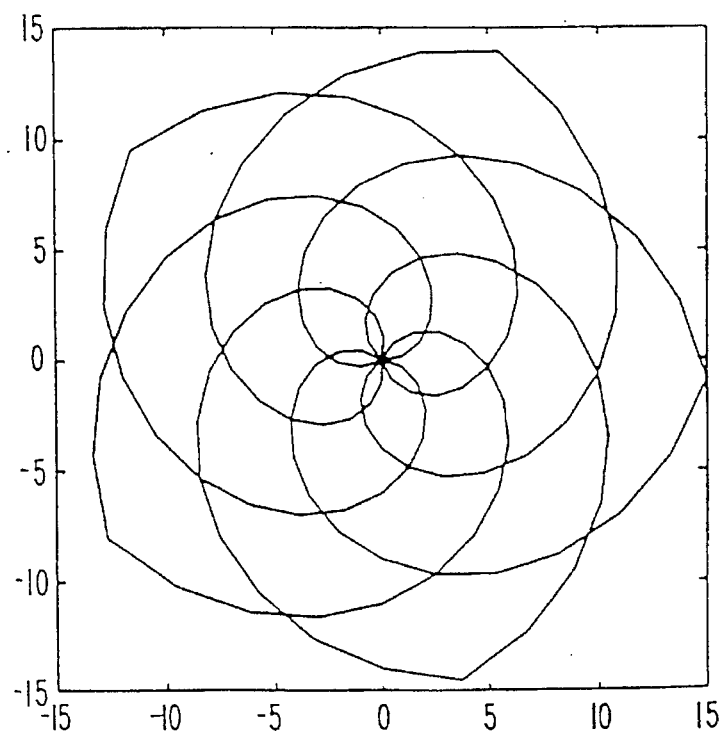
FIGS. 14 is a diagram illustrating a "petal" shaped light beam pattern.
Figure 15:
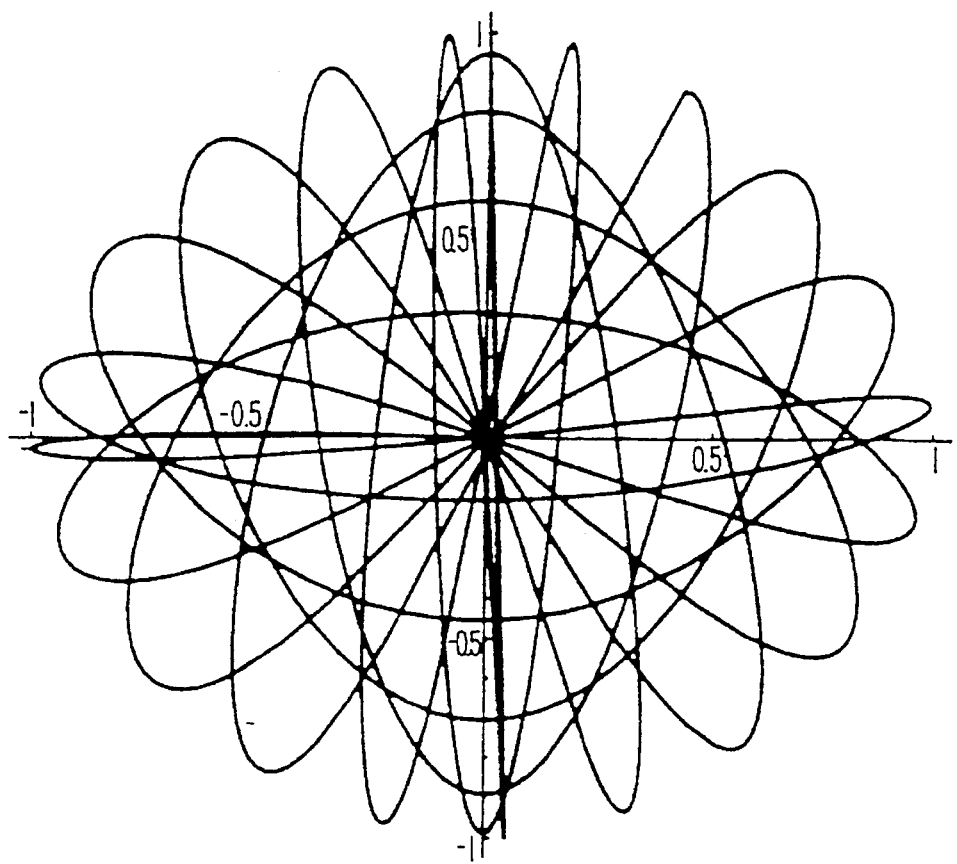
FIGS. 15 is a diagram illustrating a jittering lissajous light beam pattern.
Figure 16:
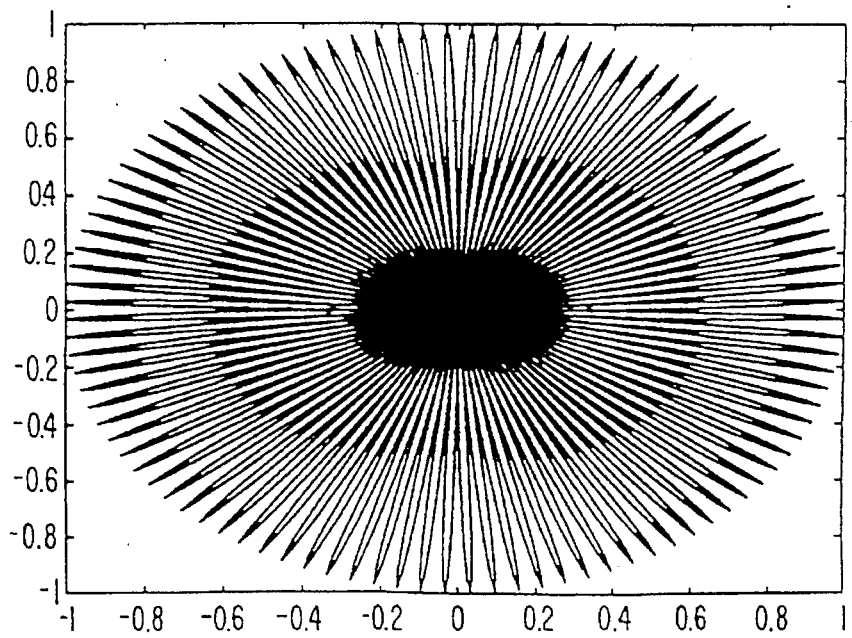
FIGS. 16 is a diagram illustrating a "star" shaped light beam pattern.

FIG. 10 illustrates a "grid" type light beam pattern. FIG. 11 illustrates a rotating and breathing ellipse, and FIG. 12 illustrates a rotating and breathing lissajous. FIG. 13 illustrates a "fishbone" type light beam pattern, and FIG. 14 a "petal" shaped light beam pattern. FIG. 15 illustrates a jittering lissajous, and FIG. 16 illustrates a "star" shaped light beam pattern.

Each light beam pattern has its own unique utility relative to a barcode symbol variously oriented within the X/Y reference axis, and relative to the environmental conditions surrounding the reference axis. For example, the fishbone pattern in FIG. 13 offers improved chances of reading 8 barcode symbol vertically or horizontally proximate to the origin of the X/Y reference axis. However, the fishbone pattern in FIG. 13 also reduces the chances of reading a barcode symbol in the outlining regions away from the origin. The particular utility offered by any given light beam pattern is determined by its application in a given situation.

D. THE ROTATOR/TRANSLATOR

Figures 17A, 17B:
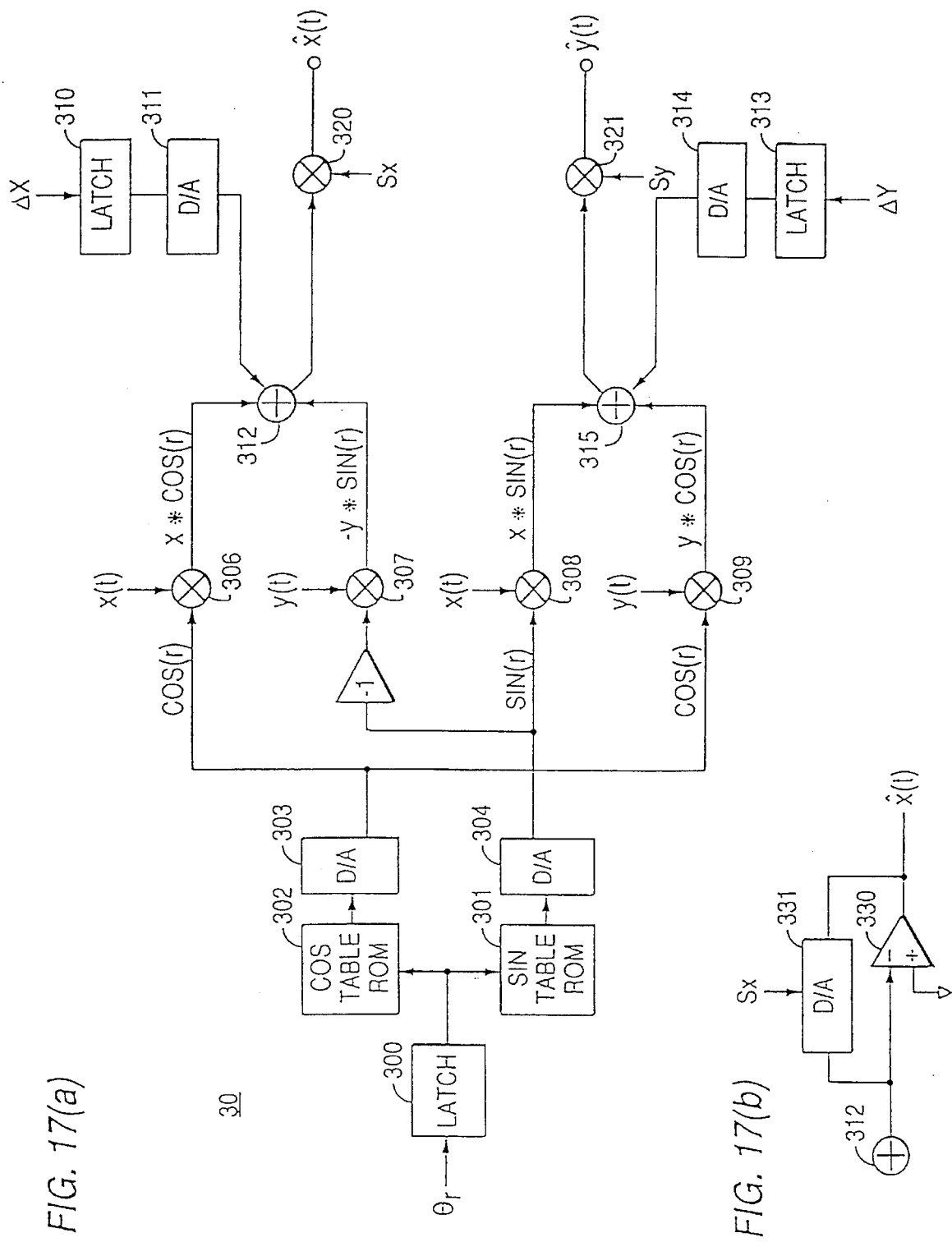

FIG. 17a illustrates a first example of a rotator/translator circuit 30 of the type used in an embodiment of the present invention. Microprocessor 10 (FIG. 6), in response to various feedback signals, generates pattern control signals which may include a displacement signal. The displacement signal is typically expressed in components: an angular rotation component, and one or more offset components.

Figure 18A:
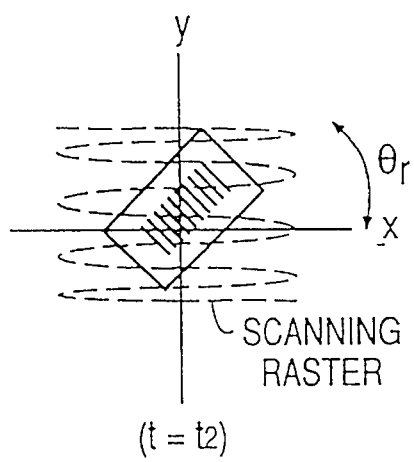
FIGS. 18(a)–18(d) are diagrams explaining the rotation and translation of a light beam pattern.

As previously discussed, scanner 40 directs a light beam pattern at a predetermined location. The disposition of the light beam at the predetermined location can be expressed in relation to a reference X/Y coordinate axis. FIG. 18(a) shows a X/Y reference axis with a standard raster light beam pattern superimposed on it. At its present angular orientation, the standard raster scans only a portion of the barcode symbol. A feedback signal, discussed hereafter, indicates the skewed angular disposition of the symbol to the standard raster light beam pattern. In response to the feedback signal, microprocessor 10 generates a displacement signal having an angular rotation component, $\theta_r$.

Figure 18B:
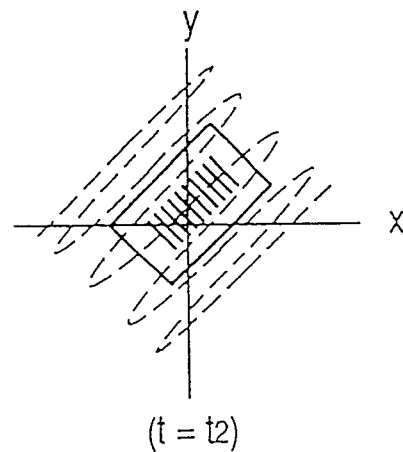

In response to the angular rotation component of the displacement signal, rotator/translator 30 transforms the $x(t_1)$ and $y(t_1)$ coordinate control signals corresponding to the standard raster shown in FIG. 18(a) into new $x(t_2)$ and $y(t_2)$ coordinate control signals which correspond to the new standard raster shown in FIG. 18(b). The standard raster shown in 18(b) is rotated about the reference axis by angle $\theta_r$ relative to the standard raster shown in 18(a).

Typically, symbols present at a predetermined location are offset in the X direction and/or the Y direction, as well as, being angularly rotated with reference axis. Such is the case shown in FIG. 18(c), where the barcode symbol is offset from the reference axis origin by $\Delta x$ and $\Delta y$ distances as well as being rotated by an angle $\theta_r$. Feedbacks signals, discussed hereafter, indicate the relative disposition of the symbol within the reference axis. In response to the feedback signals, microprocessor 10 generates a displacement signal having an angular rotation component, an X-offset component, and a Y-offset component.

Figure 18C:
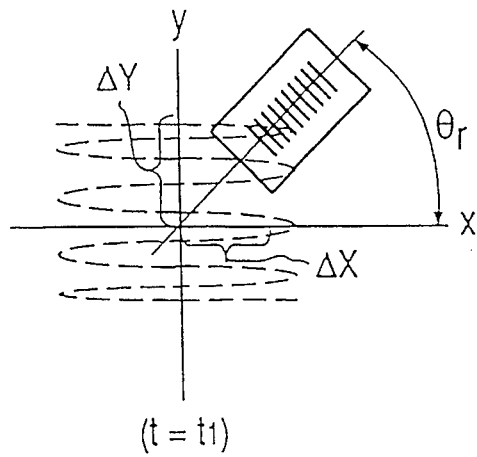
Figure 18D:
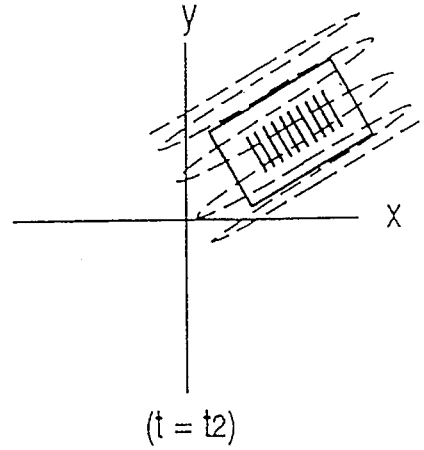

In response to that displacement signal, rotator/translator 30 transforms $x(t_1)$ and $y(t_1)$ coordinate control signals corresponding to the raster shown in FIG. 18(c) into new coordinate control signals, $x(t_2)$ and $y(t_2)$, corresponding to the raster shown in FIG. 18(d). The raster in FIG. 18(d) has been rotated about the reference axis origin by angle $\theta_r$ and translated a distance corresponding to the and offset components.

In FIG. 17a, the angular rotation component $e_r$, and offset components $\Delta X$ and $\Delta Y$ are applied to rotator/translator circuit 30. The n-bit, signed digital word that represents angular rotation component $\theta_r$ is applied from the microprocessor 10 to angle latch 300. Sine and cosine functions are addressed in respective ROM look-up tables 301 and 302. Sine and cosine functions might also be directly supplied from microprocessor 10. The n-bit, signed digital words that represent the X offset ($\Delta X$) and Y offset ($\Delta Y$) are applied to latches 310 and 313, converted into analog form by D/A converters 311 and 314, and applied to summers 312 and 315, respectively. The digital sine and cosine functions generated from the ROM look-up tables 302 and 301 are converted to analog form by D/A convertors 303 and 304, respectively, and applied to multipliers 306, 307, 308, and 309.

First multiplier 306 multiplies original coordinate control signal x(t) with function cos(r) to produce x(t)*cos(r). Second multiplier 307 multiplies original coordinate control signal y(t) with the negative value of function sin(r) to produce y(t)*sin(r). Similarly third and fourth multipliers, 308 and 309 respectively, produce x(t)*sin(r) and Y*cos(r), respectively. The products of first and second multipliers, 306 and 307, respectively, are applied to first summer 312 along with X-offset to produce transformed coordinate control signal X(t). The products of third and fourth multipliers, 308 and 309 respectively, are applied to second summer 315 along with Y-offset to produce transformed coordinate control signal Y(t).

The foregoing circuit implements rotation and translation about a reference axis in accordance with the equation shown below:

$$\begin{vmatrix} \hat{X}(t) \\ \hat{Y}(t) \end{vmatrix} = \begin{vmatrix} \cos(\theta_r) & -\sin(\theta_r) \\ \sin(\theta_r) & \cos(\theta_r) \end{vmatrix} \begin{vmatrix} X(t) \\ Y(t) \end{vmatrix} + \begin{vmatrix} \Delta X \\ \Delta y \end{vmatrix} \quad (3)$$

In the equation, X(t) and Y(t) denote the original coordinate control signals, $\hat{X}(t)$ and $\hat{Y}(t)$ denote the transformed coordinate control signals, $e_r$ is the angular rotation component, $\Delta X$ is the X-offset, and $\Delta Y$ is the Y-offset.

Rotator/translator 30 can be implemented in hardware in combination with the circuitry comprising pattern generator 20, or can be implemented as a separate, serially connected circuit. Alternately, rotator/translator 30 and pattern generator 20 functions may be partially or fully implemented in software.

As part of either the rotator/translator 30 or the pattern generator 20, an embodiment of the present invention may include a circuit or software routine to scale the size of the light beam pattern at the predetermined location. The scaling operation can be expressed by the following equation:

$$\begin{vmatrix} \hat{X}(t) \\ \hat{Y}(t) \end{vmatrix} = \begin{vmatrix} S_x & 0 \\ 0 & S_y \end{vmatrix} \begin{vmatrix} X(t) \\ Y(t) \end{vmatrix} \quad (4)$$

where $S_x$ and $S_y$ are selected scaling factors for coordinate control signals X(t) and Y(t), respectively. This equation can be implemented in a circuit similar to that shown in FIG. 17a where "multiplier" 320 receives the output of summer 312 and scaling factor signal $S_x$, and "multiplier" 321 receives the output of summer 315 and scaling factor signal $S_y$. The term "multiplier" is used to describe the scaling product derived from circuit elements 320 and 321. As shown in FIG. 17b, "multipliers" 320 and 321 may be implemented by differential amplifier 330 and DAC 331.

Figure 17C:
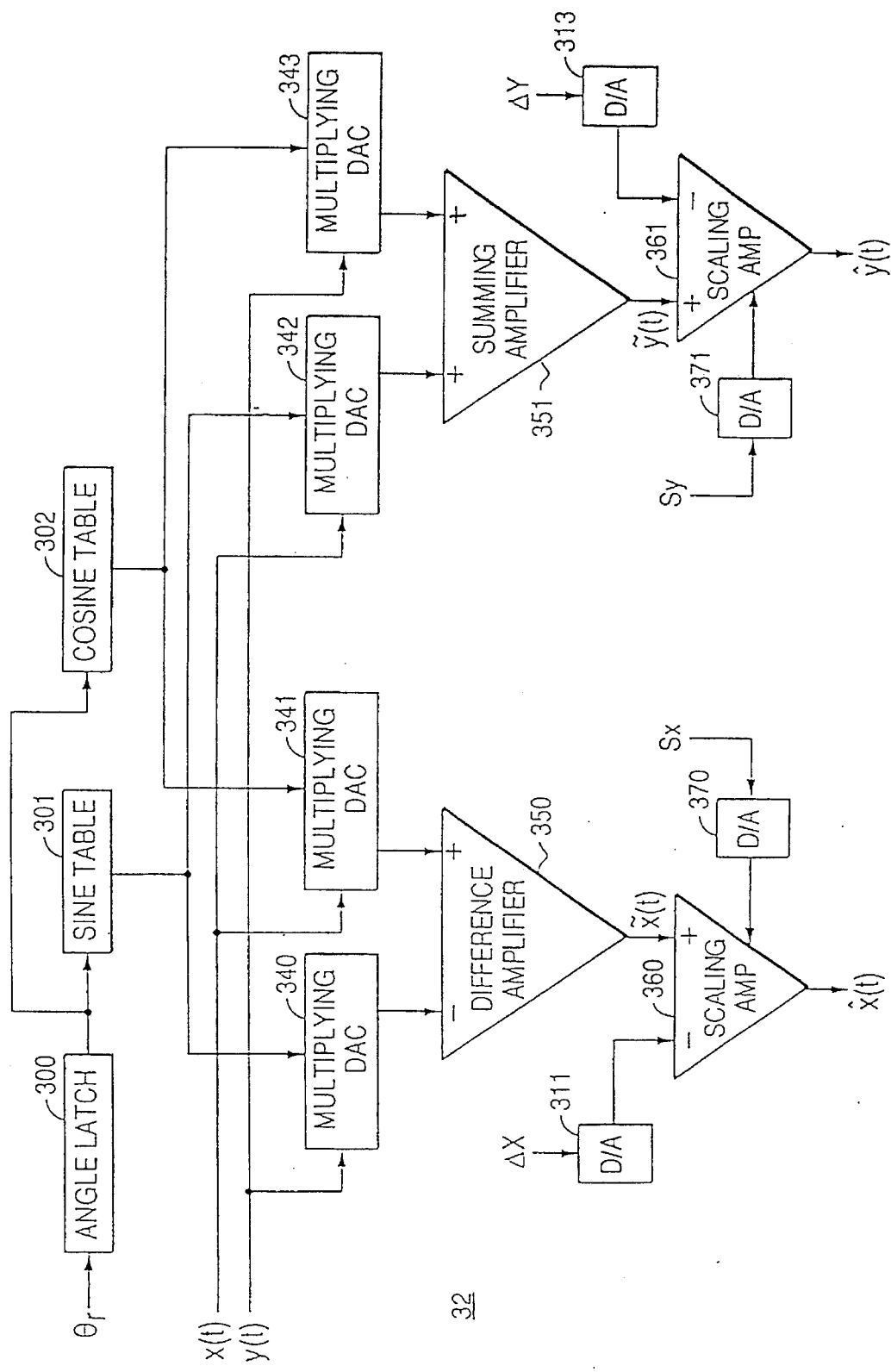
FIG. 17c is a block diagram illustrating another embodiment of the rotator/translator shown in FIG. 1.

FIG. 17c illustrates a second example of a rotator/translator circuit 31 of the type used in an embodiment of the present invention. Similar elements to the device shown in FIG. 17a are similarly designated. The angular rotation component, $θ_r$, and offset components, ΔX and ΔY, are applied to rotator/translator circuit 31. The angle measurement is preferably based on a counter-clockwise rotation. X offset, ΔX, is applied through D/A converter 311 to first scaling amplifier 360, and Y offset, ΔY, is applied through D/A converter 314 to second scaling amplifier 361. Angular rotation component θr is applied to angle latch 300 and converted into a signed 8-bit word by look-up tables 301 and 302.

The resulting sine(r) and cosine (r) functions from look-up tables 301 and 302 are applied with coordinate control signals x(t) and y(t) to first, second, third and fourth multiplying DACs 340, 341, 342, and 343 as shown in FIG. 17c. First multiplying DAC 340 produces first product y(t)*sin(r) which is applied to 8 first input of differential amplifier 350. Second multiplying DAC 341 produces second product x(t)*cos(r) and applies it to the second input of differential amplifier 350. Similarly, third and fourth multiplying DACs 342 and 343 produce third product x(t)*sin(r) and fourth product y(t),cos(r) respectively, and apply these products to the first and second inputs of summing amplifier 351.

Differential amplifier 350 produces rotated coordinate control signal $\tilde{x}(t)$=x(t)*cos(r)−y(t)*sin(r). This signal is subsequently scaled in accordance with scaling factor Sx, and translated in accordance with X offset, ΔX, in first scaling amplifier 360. The product of first scaling amplifier 360 is transformed coordinate control signal $\hat{X}(t)$.

Summing amplifier 351 produces rotated coordinate control signal $\tilde{y}(t)$=x(t)*sin(r)+y(t)*cos (r). This signal is subsequently scaled in accordance with scaling factor Sy, and translated in accordance with Y offset, ΔY, in second scaling amplifier 367. The product of second scaling amplifier 361 is transformed coordinate control signal $\hat{Y}(t)$.

The benefits of the exemplary rotator/translator circuits in FIGS. 17a and 17c as compared with comparable mechanical rotator/translators are readily apparent. For example, the speed of the exemplary rotator/translator circuits is improved, and the lack of moving parts increases reliability. Scaling can also be achieved in the generation circuitry of the drive signals in scanner 40, or in software.

E. THE SCANNER

The term scanner" heretofore used in reference to general X/Y scanner element 40 of FIG. 1 includes scanning heads and related control circuitry previously described in the commonly assigned patents referenced in the BACK- GROUND OF THE INVENTION and in the foregoing description.

Figure 19A:
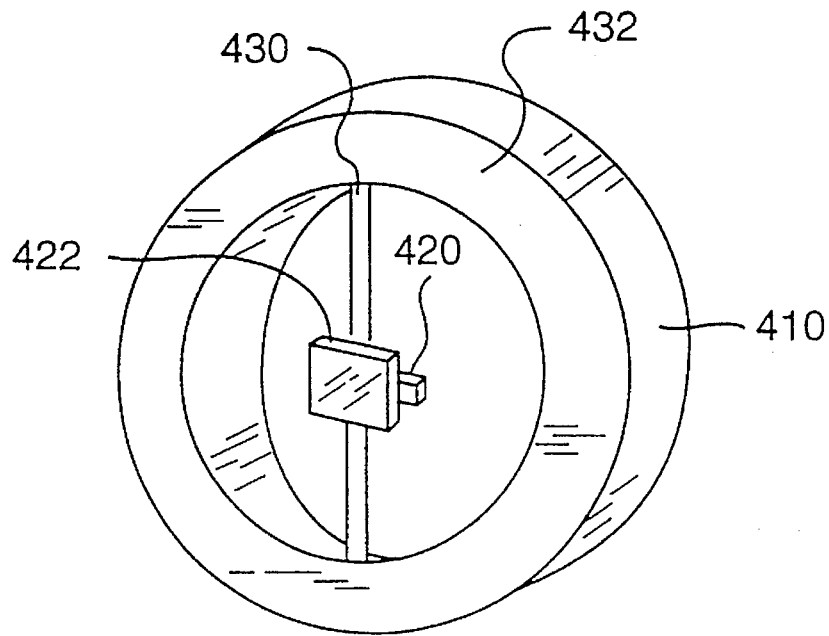
FIG. 19a is a schematic block diagram illustrating an embodiment of an X/Y scanning head within the scanner of FIG. 1.
Figure 19B:
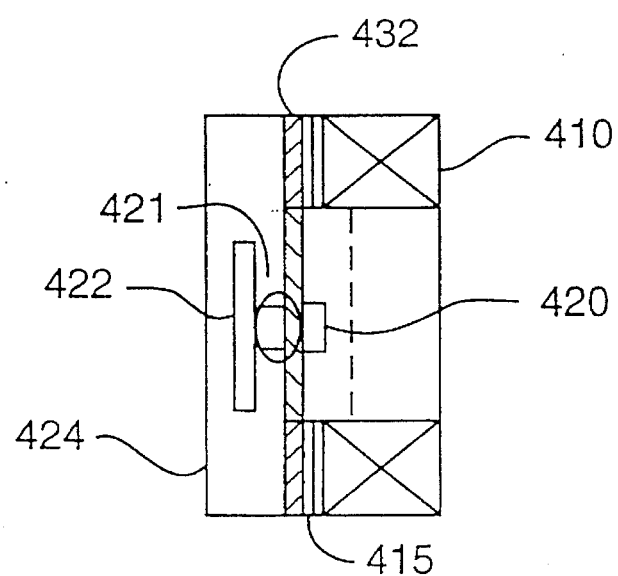

FIGS. 19a and 19b illustrate an exemplary scanning element for use within scanner 40. The torsional miniature scan element 400 shown in FIGS. 19a and 19b provides a range of operating frequencies between approximately 1 Hz to 180 Hz without physical or mechanical adjustments or tuning. In FIG. 19a mirror 422 and permanent magnet 420 are opposingly attached to and mechanically balanced on a flexible strip 430. This flexible stir is attached to opposite sides of a coil 410 by means of a flexible strip holder 432.

FIG. 19b is a cut-away side view of FIG. 19a. In FIG. 19b, the magnet/mirror holder 421 which attaches mirror 422 and permanent magnet 420 to flexible strip 430 can be seen. A shock-absorber 415 may be interposed between the flexible strip holder 432 and coil 410. Finally, a transparent mirror protector 424 may be attached to the scan element 400.

When an alternating current coordinate control signal is applied to coil 410, interaction of the magnetic fields of the coil 410 and permanent magnet 420 cause the flexible strip 430 to torsionally oscillate. X—Y scanning may be accomplished by the dual scan element arrangement shown, for example, in FIG. 19c.

Figure 19C:
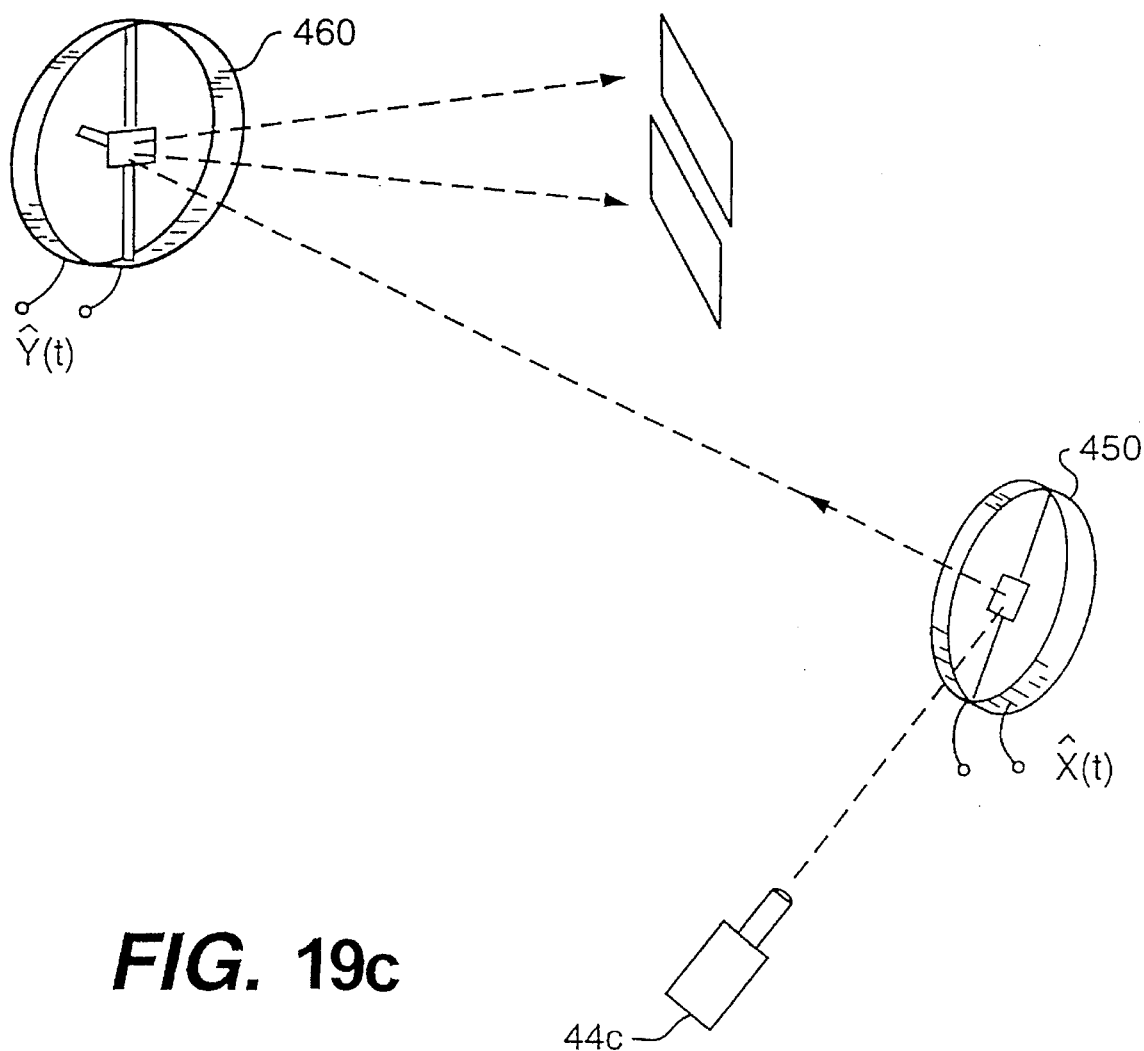
FIG. 19c is a schematic block diagram illustrating an embodiment of an X and a Y scanning head within the scanner of FIG. 1.

In FIG. 19c, a light beam from laser source 440 is directed to X-scan element 450 which deflects the light beam to Y-scan element 460. The light beam directed from Y-scan element 460 is scanned in a predetermined pattern determined by coordinate control signals X(t) and Y(t).

Figure 20:
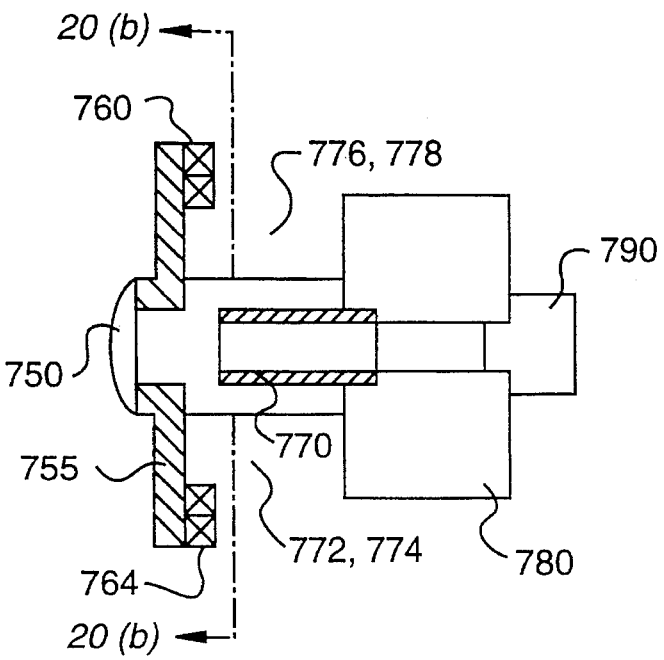
FIGS. 20a and 20b are schematic block diagram illustrating an autofocusing lens arrangement within the scanner shown in FIG. 1.
Figure 20:
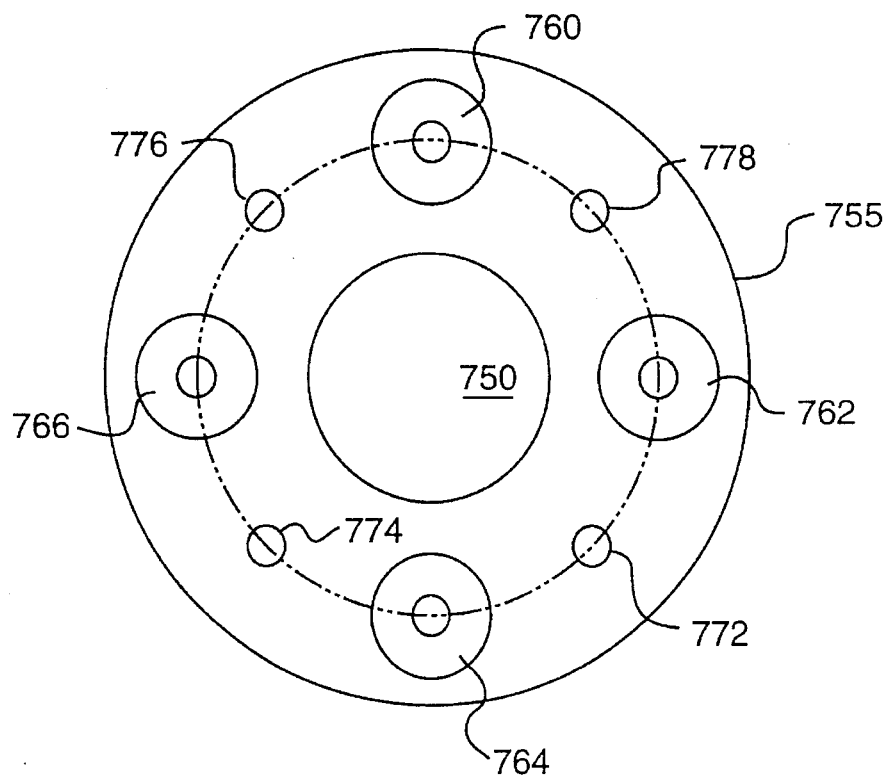

FIGS. 20(a) and 20(b) illustrate an exemplary auto-focusing, four-wire scanning head arrangement of the type usable with scanner 40 of the present invention. In FIG. 20(a), a single objective lens 750 is mounted on one side of PC board 755 and four coils 760, 762, 764, and 768 are mounted on the other side of PC board 755. PC board 455 is supported by first ends of alloy wires 772, 774, 776 and 778. Second ends of alloy wires 772, 774, 776 and 778 are attached to laser holder 780. Laser diode 790 and permanent ring magnet 770 are also mounted on laser holder 780. Alloy wires 772–778 carry drive current to respective coils 760–766.

In FIG. 20(a), a 4-pole ring magnet 770 can be used to rotate objective lens 750 to change focus by laterally lens 750 with respect to laser diode 740 to effect auto-focusing.

F. MODES OF OPERATION

The present invention provides for operation in one of three basic modes; learning mode, adapted mode, and real-time adaptive mode.

Figure 23:
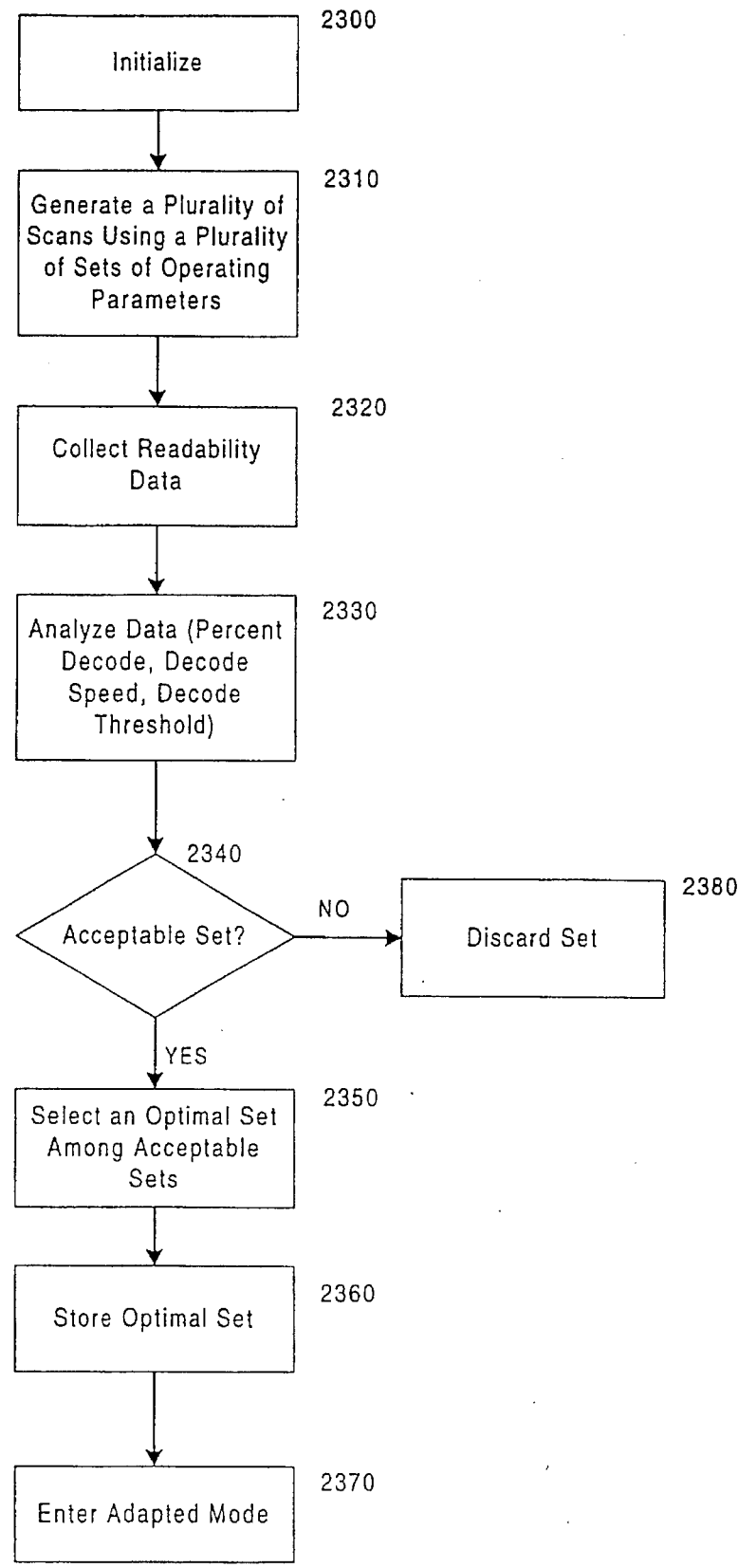
FIG. 23 shows a flowchart illustrating the operation of the scanning system in a learning mode.

Learning mode allows the scanning system to "learn" a best light beam pattern for various applications. Thus, in fixed-mode applications where articles with symbols are presented to the scanning system under fairly repeatable conditions, the scanning system can (as shown in FIG. 23) initialize the system (2300) and generate a plurality of scans of a symbol using a plurality of sets of operating parameters (2310). The operating parameters include combinations of output power, focus adjustment, and light beam pattern (location, shape, size, and/or (orientation). Readability data for the scans are collected (2320). The readability data is analyzed (percent decode, decode speed, decode threshold) to evaluate whether a set of operating parameters is acceptable (2330, 2340). An unacceptable set of operating parameters is discarded (2370). An optimal set of operating parameters is selected among the acceptable sets of operating parameters (2350). The optimal set of operating parameters is stored (2360) and the adapted mode is entered (2370). Optimal combinations of operating parameters may be stored for one-dimensional and two-dimensional barcode symbols. A user may then select the "learned" set of parameters from memory for a particular application, or the scanning system may automatically select a "learned" set of parameters. The software and/or hardware to accomplish the learning mode may reside in a neural network controlled by fuzzy logic.

Figure 24:
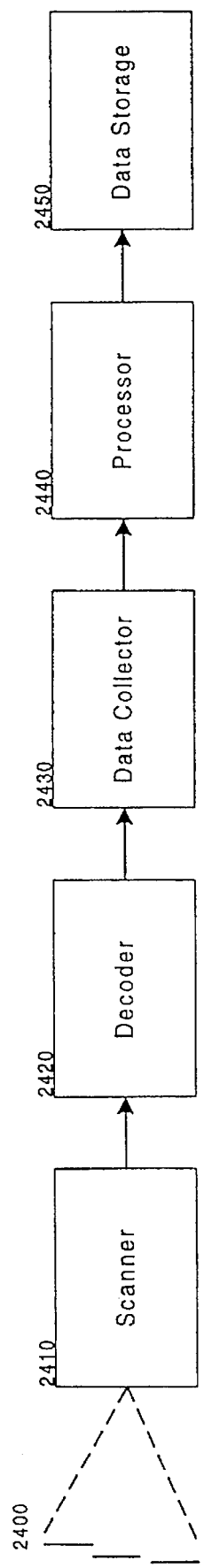
FIG. 24 shows a block diagram of the scanning system that performs the method shown in FIG. 23.

FIG. 24 shows a block diagram of a system for performing the steps shown in FIG. 23. The symbol 2400 is scanned by scanner 2410. Scanner 2410 may be operated using a plurality of sets of operating parameters. Decoder 2420 decodes the scans generated by scanner 2410. The data collector 2430 collects readability data associated with the scans generated by scanner 2410. Processor 2440 analyzes the collected readability data, determines whether a set of operating parameters is acceptable, and then selects an optimal set of operating parameters among acceptable sets of operating parameters. The optimal set of operating parameters is stored in data storage 2450.

A scanning system may also learn optimal combinations of operating parameters for hand-held applications. For example, small raster patterns have shown improved results over single-line scans in reading truncated one-dimensional barcode symbols. A truncated barcode symbol is one which because of its small Y/X aspect ratio, is not completely scanned by the light-beam pattern. The present invention provides the ability to learn an optimal small raster scan for reading one-dimensional barcode symbols.

Small raster scans are defined by $x(t)=X_{max}\sin(2\pi fxt)$, and $y(t)=Y_{max}\sin(2\pi fyt)$. Assuming $fx=60$ $H_z$ and that the maximum amplitude of x, $X_{max}$, is fixed, the ratios fx/fy and $Y_{max}/X_{max}$ are referred to as the frequency and height ratios. The frequency and height ratios may be selected to optimize barcode symbol readability depending on the type and size of symbol read.

Once a set of optimal operating parameters has been obtained and entered into the control logic of the scanning system, the system will operate in a set, or adapted mode until instructed to operate otherwise. Thus, a scanning system operating in adapted mode will direct the light beam according to the "learned" set of operating parameters. An adapted mode of operation can be overridden by manual or other external signals, as well as, by internal override signals which arise if the adapted mode fails to decode symbols due to some change in the environment.

In applications, such as the following conveyor belt and fixed presentation examples where the nature and disposition of symbols is highly variable, the scanning system may be operated in a real-time adaptive mode. In the real-time adaptive mode, the scanning system continually seeks to adjust scanning system operating parameters, and in particular the light beam pattern, to maximize symbol readability. Once again, control of the real-time adaptive mode may be accomplished using fuzzy logic.

G. FEEDBACK SIGNALS

Many different feedback signals may be used by microprocessor 10 (FIG. 1) to adapt the light beam pattern directed at the predetermined location. These feedback signals may be divided into two categories: internal feedback signals derived from a detected portion of the reflected light beam or from a source within the scanning system, and control signals. Examples of both categories are discussed below.

(1) Mode of Scanning

Sensors within the scanning system or manual inputs indicate to microprocessor 10 whether the scanning system is being used in a hand-held or fixed mode. In response to an indication that the scanning system is being operated in a hand-held mode, microprocessor 10 will generate pattern control signals to produce a linear (or near linear, such as a small raster) light beam pattern which can be easily aimed by a user.

Alternatively, microprocessor 10 might generate a predetermined two-dimensional light beam pattern, or a series of patterns, in response to a feedback signal indication of fixed mode operation. As previously discussed, the present invention provides means for operating in a "learning mode," wherein the scanning system generates a series of light beam patterns and "learns" which pattern most efficiently reads symbols in a particular application. Since a large number of fixed mode scanning applications are repeatable in the sense that symbols are presented to the scanning system under similar environmental conditions, the scanning system may learn an "acceptable" light beam pattern and recall that pattern in a particular fixed mode application. Acceptable light beam patterns for multiple fixed mode applications can be learned and stored in memory. Each "learned" acceptable light beam pattern can then be recalled on the basis of a manual selection, or a scanning system determination based on some other feedback signal.

(2) Percent Decode

Upon obtaining a scan, the scanning system of the present invention seeks to decode the digital data derived from the scan in the manner previously discussed. When operating in the "learning mode" or in the "real-time adaptive mode," the scanning system successively scans the predetermined location and attempts to decode the detected portion of the reflected light beam. By successively scanning and attempting to decode a symbol at the predetermined location, the scanning system develops percent decode data.

For example, a scanning system operating in a real-time adaptive mode might successively scan and attempt to decode a symbol ten times. Multiple decoding attempts occur fast enough to be user transparent. If, assuming a threshold of 70%, the scanning system successfully decodes 8 or more scans out of 10, then a positive decode indication is given to the user and the decoded data is accepted by the scanning system. However, if 3 or more attempts to decode successive scans are unsuccessful, then the scanning system adjusts the light beam pattern and again attempts to obtain 8 or more out of 10 successfully decoded scans.

A scanning system operating in a "learning mode", might successively scan and attempt to decode a symbol ten times. Again assuming a threshold of 70%, the scanning system will save a particular see of operating parameter, as an acceptable set of operating parameters once 8 or more scans have been successfully decoded.

(3) Edge Detection

U.S. application Ser. No. 862,471, filed Apr. 2, 1992, now U.S. Pat. No. 5,302,813 (hereafter the "Multi-bin Digitizer" application) which is commonly assigned to the assignee of the present invention and hereby incorporated by reference, describes a multi-bit digitizer for a barcode symbol scanning system. Whereas conventional digitizers only detect the presence of barcode symbol edges, the multi-bit digitizer detects the presence of an edge, and measures the strength of the detected edge. This additional information is passed to a decoder to facilitate multi-bit threshold processing by resident software routines. The edge strength signal is also presented to the microprocessor 10 as a feedback signal and is a factor in determining an optimal, or at lease an improved light beam pattern and/or laser spot focusing adjustment for reading a symbol.

Figure 21:
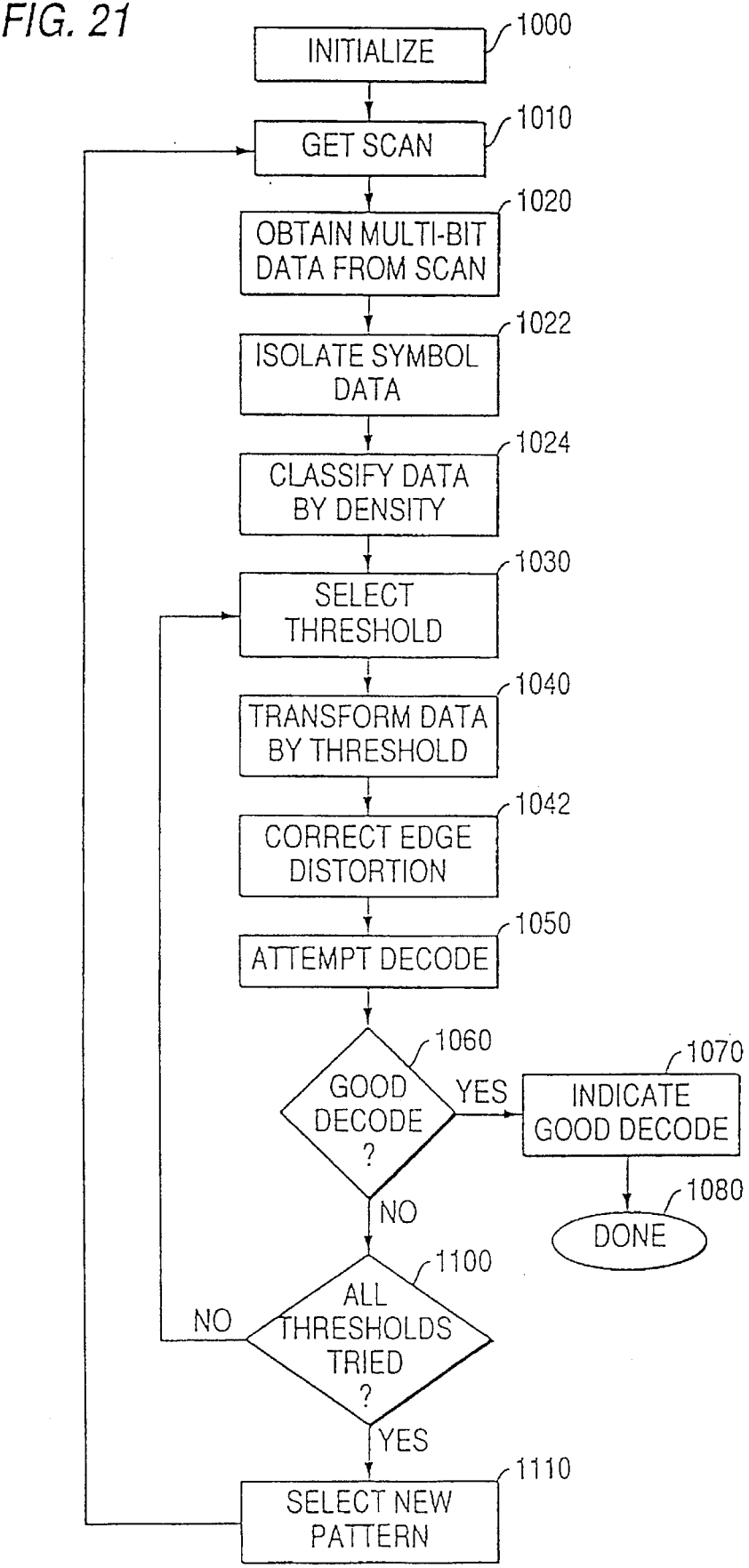
FIG. 21 is a flowchart illustrating the operation of a multi-bit digitizer in the scanning system of FIG. 1.
Figure 22:
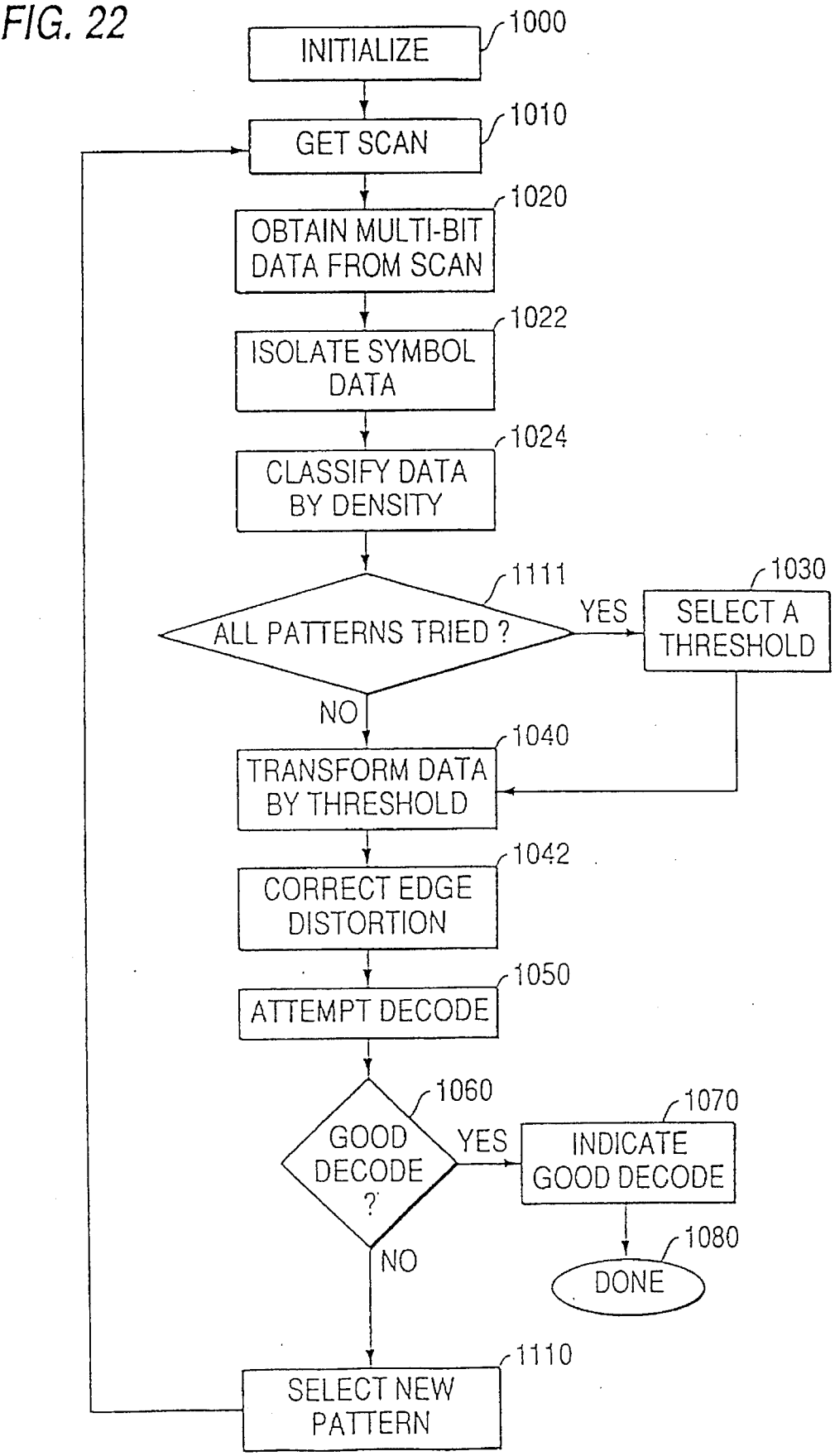
FIG. 22 is a flowchart illustrating another operation of a multi-bit digitizer in the scanning system of FIG. 1.

Operation of the multi-bit digitizer as a feedback signal source within an embodiment of the present invention is illustrated in diagrams shown in FIGS. 21 and 22. After initialization (1000), a scanning system obtains a scan (1010). Once a scan is obtained, an analog signal representative of the scan is produced and the positive and negative edges of the scan are detected. The strength of the detected edges and timing signals indicative of the relation are generated as multi-bit digital data (1020). Symbol data is isolated from the symbol margins and from other unwanted graphical text data (1022). Symbol density is classified based on the rise time and edge durations of a predetermined timing signal and the edge strength signed (1024). The timing signal and digital signals are applied to a decoder which performs multiple threshold processing on individual scans by processing each scan a multiple number of times at different detection threshold levels. Thus, for each scan a first predetermined threshold is selected (1030), and the multi-bit data is transformed using the threshold (1040). Before decoding is attempted (1050), edge distortion is corrected using the timing and edge strength signals of adjacent for wide and narrow elements. If decoding is successful (1060-yes), a positive indication is output to a user interface (1070) and the process is done (1080).

If, however, the first selected threshold is unsuccessful in decoding the scan (1060-no) a next predetermined threshold is selected (1100-no) and the process returns to step (1030). At some point where a number of predetermined thresholds have failed to successfully decode the scan, a determination is made that all thresholds have been tested. If so, (1100-yes) the scanning system will select a new light beam pattern (1110) and return to step (1010) to obtain a scan. The new light beam pattern selected in step (1110) may be selected on the basis of a preset series of light beam patterns, or on the basis of another feedback signal, for example, percent decode, barcode symbol position, etc.

FIG. 22 illustrates an alternative method wherein similarly labeled steps perform functions similar to those in FIG. 21. However, once a first threshold has been selected during initialization (1000) the method tests whether all light beam patterns have been tried for that threshold (1111). If all light beam patterns have not been tried the method continues to select new patterns (1110) so long as decoding is unsuccessful (1060-no). Once all of the predetermined light beam patterns have been tried, a second and subsequent thresholds are selected (1030).

It will be apparent to those skilled in the art that various modifications and variations can be made in the scanning system method and apparatus without departing form the scope or spirit on the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for scanning a bar code symbol including steps for:

scanning a bar code symbol a plurality of times using different light beam patterns;

collecting readability data indicating whether the scanning of a bar code symbol decodes successfully or unsuccessfully for the different light beam patterns; and determining, based on the collected readability data, which of the light beam patterns are acceptable light beam patterns for use with the bar code symbol.

2. The method for scanning a bar code symbol as in claim 1 further including a storage means for storing an optimal one of the acceptable light beam patterns and identifying information about the bar code symbol.

3. The method for scanning a bar code symbol as in claim 1 wherein the step of collecting readability data includes determining what percentage of bar code scans for a corresponding light beam pattern decode successfully.

4. A system for scanning a bar code symbol including:

means for scanning a bar code symbol a plurality of times using different light beam patterns;

means for collecting readability data indicating whether the scanning of a bar code symbol decodes successfully or unsuccessfully for the different light beam patterns; and means for determining, based on the collected readability data, which of the light beam patterns are acceptable light beam patterns for use with the bar code symbol.

5. The system for scanning a bar code symbol as in claim 4 further including a storage means for storing an optimal one of the acceptable light beam patterns and identifying information about the bar code symbol.

6. The system for scanning a bar code symbol as in claim 4 wherein the means for collecting readability data includes means for determining what percentage of bar code scans for a corresponding light beam pattern decode successfully.

7. A method of operating a bar code scanner comprising the steps of:

storing a plurality of scanning patterns for different fixed mode scanning operations;

recalling one of the plurality of stored scanning patterns by manual selection; and scanning a bar code symbol using the recalled one of the scanning patterns.

8. A method of operating a bar code scanner having a learning mode and an operational mode comprising the steps of:

performing a plurality of scanner operations in the learning mode using different combinations of output power, focus and beam patterns in a selected scanning environment;

obtaining statistical data in response to the plurality of scanner operations, the statistical data reflecting one of percent decode, decode speed and decode thresholding;

selecting an optimum combination of output power, focus and light beam patterns for the scanning environment;

operating the scanner in the operational mode by recalling the selected optimum combination for the scanning environment.

9. A method for scanning a symbol including steps of:

(a) scanning a symbol a plurality of times using a plurality of sets of operating parameters;

(b) collecting readability data indicating whether the scanning of a symbol decodes successfully or unsuccessfully for the plurality of sets of operating parameters;

(c) determining whether the readability data is acceptable for each of the plurality of sets of operating parameters;

(d) selecting an optimal set of operating parameters from the plurality of sets of operating parameters with acceptable readability data; and (e) storing the optimal set of operating parameters.

10. A method for scanning a symbol according to claim 9 wherein the set of operating parameters, used in the step of scanning, designates a light beam pattern selected from a plurality of different light beam patterns.

11. The method for scanning a symbol as in claim 10 wherein the different light beam patterns include a grid shaped light beam pattern.

12. The method for scanning a symbol as in claim 10 wherein the different light beam patterns include a rotating and breathing ellipse light beam pattern.

13. The method for scanning a symbol as in claim 10 wherein the different light beam patterns include a rotating and breathing lissajous light beam pattern.

14. The method for scanning a symbol as in claim 10 wherein the different light beam patterns include a fishbone shaped light beam pattern.

15. The method for scanning a symbol as in claim 10 wherein the different light beam patterns include a petal shaped light beam pattern.

16. The method for scanning a symbol as in claim 10 wherein the different light beam patterns include a jittering lissajous light beam pattern.

17. The method for scanning a symbol as in claim 10 wherein the different light beam patterns include a star shaped light beam pattern.

18. A method for scanning a symbol according to claim 9 wherein the set of operating parameters, used in the step of scanning, designates a level of output power.

19. A method for scanning a symbol according to claim 9 wherein the set of operating parameters, used in the step of scanning, designates a focus.

20. A method for scanning a symbol according to claim 9 wherein the set of operating parameters, used in the step of scanning, designates a combination of output power, focus and a light beam pattern.

21. A method for scanning a symbol according to claim 9 wherein the step of scanning includes a plurality of scans for each set of operating parameters and the step of determining includes determining what percentage of the plurality of scans for a corresponding set of operating parameters decodes successfully.

22. A method for scanning a symbol according to claim 21 wherein the readability data is determined to be successful when the percentage of scans that decode successfully is greater than or equal to eighty percent.

23. A system for scanning a symbol including:
   means for scanning a symbol a plurality of times using a plurality of sets of operating parameters;
   means for collecting readability data indicating whether the scanning of a symbol decodes successfully or unsuccessfully for each of the plurality of sets of operating parameters;
   means for determining whether the readability data is acceptable for each of the plurality of sets of operating parameters and for selecting an optimal set of operating parameters from the plurality of sets of operating parameters with acceptable readability data; and
   means for storing the optimal set of operating parameters.

24. A system for scanning a symbol according to claim 23 wherein each of the plurality of sets of operating parameters, used by the scanning means, designates a light beam pattern selected from a plurality of different light beam patterns.

25. A system for scanning a symbol as in claim 24 wherein the plurality of different light beam patterns includes a grid shaped light beam pattern.

26. The system for scanning a symbol as in claim 24 wherein the plurality of different light beam patterns includes a rotating and breathing ellipse light beam pattern.

27. The system for scanning a symbol as in claim 24 wherein the plurality of different light beam patterns includes a rotating and breathing lissajous light beam pattern.

28. The system for scanning a symbol as in claim 24 wherein the plurality of different light beam patterns includes a fishbone shaped light beam pattern.

29. The system for scanning a symbol as in claim 24 wherein the plurality of different light beam patterns includes a petal shaped light beam pattern.

30. The system for scanning a symbol as in claim 24 wherein the plurality of different light beam patterns includes a jittering lissajous light beam pattern.

31. The system for scanning a symbol as in claim 24 wherein the plurality of different light beam patterns includes a star shaped light beam pattern.

32. A system for scanning a symbol according to claim 23 wherein each of the plurality of sets of operating parameters, used by the scanning means, designates a level of output power.

33. A system for scanning a symbol according to claim 23 wherein each of the plurality of sets of operating parameters, used by the scanning means, designates a focus.

34. A system for scanning a symbol according to claim 23 wherein each of the plurality of sets of operating parameters, used by the scanning means, designates a combination of output power, focus and a light beam pattern.

35. A system for scanning a symbol according to claim 23 wherein the means for scanning includes means for generating a plurality of scans for each of the sets of operating parameters and the means for determining includes means for determining what percentage of the plurality of scans for a corresponding set of operating parameters decodes successfully.

36. A system for scanning a symbol according to claim 35 wherein the readability data is determined to be successful when the percentage of scans that decode successfully is greater than or equal to eighty percent.

37. A system for scanning a symbol including:
   a scanner for generating a scan of a symbol a plurality of times using a plurality of sets of operating parameters;
   a decoder for decoding the plurality of scans generated by the scanner;
   a data collector for collecting readability data indicating whether the generated scan decodes successfully or unsuccessfully for each of the sets of operating parameters;
   a processor for determining whether the readability data is acceptable for each of the sets of operating parameters and for selecting an optimal set of operating parameters from the acceptable sets of operating parameters; and
   a storage device for storing the optimal set of operating parameters.

38. A system for scanning a symbol according to claim 37 wherein each of the plurality of sets of operating parameters, used by the scanner, designates a light beam pattern selected from a plurality of different light beam patterns.

39. A system for scanning a symbol as in claim 38 wherein the plurality of different light beam patterns includes a grid shaped light beam pattern.

40. The system for scanning a symbol as in claim 38 wherein the plurality of different light beam patterns includes a rotating and breathing ellipse light beam pattern.

41. The system for scanning a symbol as in claim 38 wherein the plurality of different light beam patterns includes a rotating and breathing lissajous light beam pattern.

42. The system for scanning a symbol as in claim 38 wherein the plurality of different light beam patterns includes a fishbone shaped light beam pattern.

43. The system for scanning a symbol as in claim 38 wherein the plurality of different light beam patterns includes a petal shaped light beam pattern.

44. The system for scanning a symbol as in claim 38 wherein the plurality of different light beam patterns includes a jittering lissajous light beam pattern.

45. The system for scanning a symbol as in claim 38 wherein the plurality of different light beam patterns includes a star shaped light beam pattern.

46. A system for scanning a symbol according to claim 37 wherein each of the plurality of sets of operating parameters, used by the scanner, designate a level of output power.

47. A system for scanning a symbol according to claim 37 wherein each of the plurality of sets of operating parameters designate a focus parameter.

48. A system for scanning a symbol according to claim 37 wherein each of the plurality of sets of operating parameters designate a combination of output power, a focus parameter and a light beam pattern.

* * * * *